US009855589B2

(12) United States Patent
Dunn et al.

(10) Patent No.: US 9,855,589 B2
(45) Date of Patent: Jan. 2, 2018

(54) SUPPORT CLEANING SYSTEM

(71) Applicant: Stratasys, Inc., Eden Prairie, MN (US)

(72) Inventors: Benjamin N. Dunn, Savage, MN (US); Thomas J. McDonough, Inver Grove Heights, MN (US); Bryan L. Smith, Lakeville, MN (US); William J. Swanson, Saint Paul, MN (US); James E. Orrock, Eden Prairie, MN (US); Claudia Mosher, Brooklyn Park, MN (US); Randall R. Shay, Chaska, MN (US); Robert L. Skubic, Chanhassen, MN (US); Martin G. Zalusky, Bloomington, MN (US); David M. Kozlak, Medina, MN (US); Jerome W. Goetzke, Mahtomedi, MN (US)

(73) Assignee: Stratasys, Inc., Eden Prairie, MN (US)

( * ) Notice: Subject to any disclaimer, the term of this patent is extended or adjusted under 35 U.S.C. 154(b) by 187 days.

(21) Appl. No.: 14/679,392

(22) Filed: Apr. 6, 2015

(65) Prior Publication Data

US 2015/0209836 A1 Jul. 30, 2015

Related U.S. Application Data

(62) Division of application No. 12/984,937, filed on Jan. 5, 2011, now Pat. No. 9,592,539.

(60) Provisional application No. 61/292,228, filed on Jan. 5, 2010, provisional application No. 61/335,327, filed on Jan. 5, 2010.

(51) Int. Cl.
*B08B 3/08* (2006.01)
*B08B 3/04* (2006.01)
*B08B 3/10* (2006.01)
*B29C 64/40* (2017.01)
*B33Y 40/00* (2015.01)

(52) U.S. Cl.
CPC ............... *B08B 3/08* (2013.01); *B08B 3/045* (2013.01); *B08B 3/102* (2013.01); *B29C 64/40* (2017.08); *B33Y 40/00* (2014.12)

(58) Field of Classification Search
None
See application file for complete search history.

(56) References Cited

U.S. PATENT DOCUMENTS

| 2,651,311 A | 9/1953 | Rule |
| 2,653,617 A | 9/1953 | Zaber |
| 2,967,530 A | 1/1961 | Shoemaker et al. |

(Continued)

FOREIGN PATENT DOCUMENTS

| EP | 0928316 | 7/1999 |
| WO | 2006022528 | 3/2006 |

OTHER PUBLICATIONS

International Search Report and Written Opinion for PCT Application No. PCT/US2011/020212, dated Jul. 22, 2013, 13 pages.

(Continued)

*Primary Examiner* — Nicole Blan
(74) *Attorney, Agent, or Firm* — Peter J. Ims; Westman, Champlin & Koehler, P.A.

(57) ABSTRACT

An automated support cleaning system comprising a tank disposed within a housing and configured to circulate an aqueous cleaning solution to remove a support structure from a three-dimensional model.

18 Claims, 25 Drawing Sheets

(56) References Cited

U.S. PATENT DOCUMENTS

| | | | |
|---|---|---|---|
| 2,989,756 A | 6/1961 | Gaston | |
| 3,291,458 A | 12/1966 | Hamm | |
| 3,320,963 A | 5/1967 | Walker | |
| 4,138,273 A | 2/1979 | Lukac et al. | |
| 4,397,986 A | 8/1983 | Hombaker | |
| 4,517,220 A | 5/1985 | Rose | |
| 4,551,369 A | 11/1985 | Belz | |
| 4,594,228 A | 6/1986 | Lambert et al. | |
| 4,651,762 A | 3/1987 | Bowden | |
| 4,671,982 A | 6/1987 | Belz | |
| 4,766,916 A | 8/1988 | Bowden | |
| 4,773,436 A | 9/1988 | Cantrell et al. | |
| 4,818,303 A | 4/1989 | Cole | |
| 4,820,450 A * | 4/1989 | Wile | C11D 1/40 134/13 |
| 4,870,148 A | 9/1989 | Belz | |
| 4,886,856 A | 12/1989 | Chen et al. | |
| D306,223 S | 2/1990 | Muirhead et al. | |
| D314,646 S | 2/1991 | Brookman | |
| 4,995,409 A | 2/1991 | Watts | |
| 5,121,329 A | 6/1992 | Crump | |
| 5,190,375 A | 3/1993 | Shiobara | |
| 5,303,141 A | 4/1994 | Batchelder et al. | |
| 5,317,043 A | 5/1994 | Gass | |
| 5,318,056 A | 6/1994 | Kusz et al. | |
| 5,322,078 A | 6/1994 | Tuttle | |
| 5,322,878 A | 6/1994 | Deibig et al. | |
| D348,920 S | 7/1994 | Shero | |
| 5,336,755 A | 8/1994 | Pape | |
| 5,340,433 A | 8/1994 | Crump | |
| 5,346,955 A | 9/1994 | Sasse et al. | |
| 5,378,751 A | 1/1995 | Deibig et al. | |
| 5,402,351 A | 3/1995 | Batchelder et al. | |
| 5,474,719 A | 12/1995 | Fan et al. | |
| 5,503,785 A | 4/1996 | Crump et al. | |
| D370,096 S | 5/1996 | Niemela et al. | |
| 5,586,085 A | 12/1996 | Lichte | |
| 5,647,386 A * | 7/1997 | Kaiser | B08B 3/00 134/111 |
| 5,653,925 A | 8/1997 | Batchelder | |
| 5,695,707 A | 12/1997 | Almquist et al. | |
| 5,764,521 A | 6/1998 | Batchelder et al. | |
| 5,863,885 A | 1/1999 | Ruggieri et al. | |
| 5,866,058 A | 2/1999 | Batchelder et al. | |
| 5,939,008 A | 8/1999 | Comb et al. | |
| D414,904 S | 10/1999 | Knowlton | |
| 6,022,207 A | 2/2000 | Dahlin et al. | |
| 6,041,799 A * | 3/2000 | Aoki | B08B 3/12 134/1 |
| 6,067,480 A | 5/2000 | Stuffle et al. | |
| 6,070,107 A | 5/2000 | Lombardi et al. | |
| 6,080,361 A * | 6/2000 | Borovsky | A61L 12/02 134/10 |
| 6,129,872 A | 10/2000 | Jang | |
| 6,165,406 A | 12/2000 | Jang et al. | |
| 6,175,422 B1 | 1/2001 | Penn et al. | |
| 6,228,923 B1 | 5/2001 | Lombardi et al. | |
| 6,264,360 B1 | 7/2001 | Lehmusvaara et al. | |
| 6,267,124 B1 | 7/2001 | Bowden | |
| 6,398,495 B1 | 6/2002 | Kazianus | |
| 6,572,807 B1 | 6/2003 | Fong | |
| 6,645,412 B2 | 11/2003 | Priedeman, Jr. et al. | |
| 6,722,872 B1 | 4/2004 | Swanson et al. | |
| 6,790,403 B1 | 9/2004 | Priedeman, Jr. et al. | |
| 6,814,907 B1 | 11/2004 | Comb | |
| 6,824,738 B1 | 11/2004 | Neeper et al. | |
| 6,907,307 B2 | 6/2005 | Chen et al. | |
| 6,923,634 B2 | 8/2005 | Swanson et al. | |
| 7,077,638 B2 | 7/2006 | Leyden et al. | |
| D575,911 S | 8/2008 | Greenidge et al. | |
| 7,648,609 B2 | 1/2010 | Leder et al. | |
| 7,875,127 B2 | 1/2011 | Porter et al. | |
| 8,016,946 B2 | 9/2011 | Porter et al. | |
| 2002/0006658 A1 * | 1/2002 | Horn | B01F 3/06 435/262.5 |
| 2002/0045347 A1 | 4/2002 | Worm et al. | |
| 2002/0096199 A1 * | 7/2002 | Duckett | C23G 3/00 134/26 |
| 2002/0116959 A1 | 8/2002 | Ohta et al. | |
| 2003/0067098 A1 * | 4/2003 | Newell | B29C 67/0085 264/442 |
| 2003/0090752 A1 | 5/2003 | Rosenberger et al. | |
| 2004/0018949 A1 * | 1/2004 | Lee | B24B 37/042 510/175 |
| 2004/0076076 A1 | 4/2004 | Hoobyar et al. | |
| 2004/0222561 A1 | 11/2004 | Hopkins | |
| 2004/0255974 A1 * | 12/2004 | Burress | |
| 2005/0004282 A1 * | 1/2005 | Priedeman, Jr. | B29C 41/08 524/115 |
| 2005/0103360 A1 * | 5/2005 | Tafoya | B08B 3/045 134/18 |
| 2005/0129941 A1 | 6/2005 | Comb et al. | |
| 2005/0133155 A1 | 6/2005 | Leder et al. | |
| 2005/0173838 A1 | 8/2005 | Priedeman, Jr. et al. | |
| 2007/0003656 A1 | 1/2007 | LaBossiere et al. | |
| 2007/0119217 A1 | 5/2007 | Worthington | |
| 2007/0228590 A1 | 10/2007 | LaBossiere et al. | |
| 2008/0210280 A1 | 9/2008 | Publ | |
| 2008/0213419 A1 | 9/2008 | Skubic et al. | |
| 2009/0035405 A1 | 2/2009 | Leavitt | |
| 2009/0071515 A1 | 3/2009 | Prokopenko | |
| 2009/0211616 A1 | 8/2009 | Tafoya | |
| 2009/0283119 A1 | 11/2009 | Moussa et al. | |
| 2009/0301142 A1 | 12/2009 | Marioni | |
| 2012/0067369 A1 | 3/2012 | Currell et al. | |

OTHER PUBLICATIONS

Office Action dated Apr. 20, 2015, for corresponding U.S. Appl. No. 12/984,937, filed Jan. 5, 2011.

\* cited by examiner

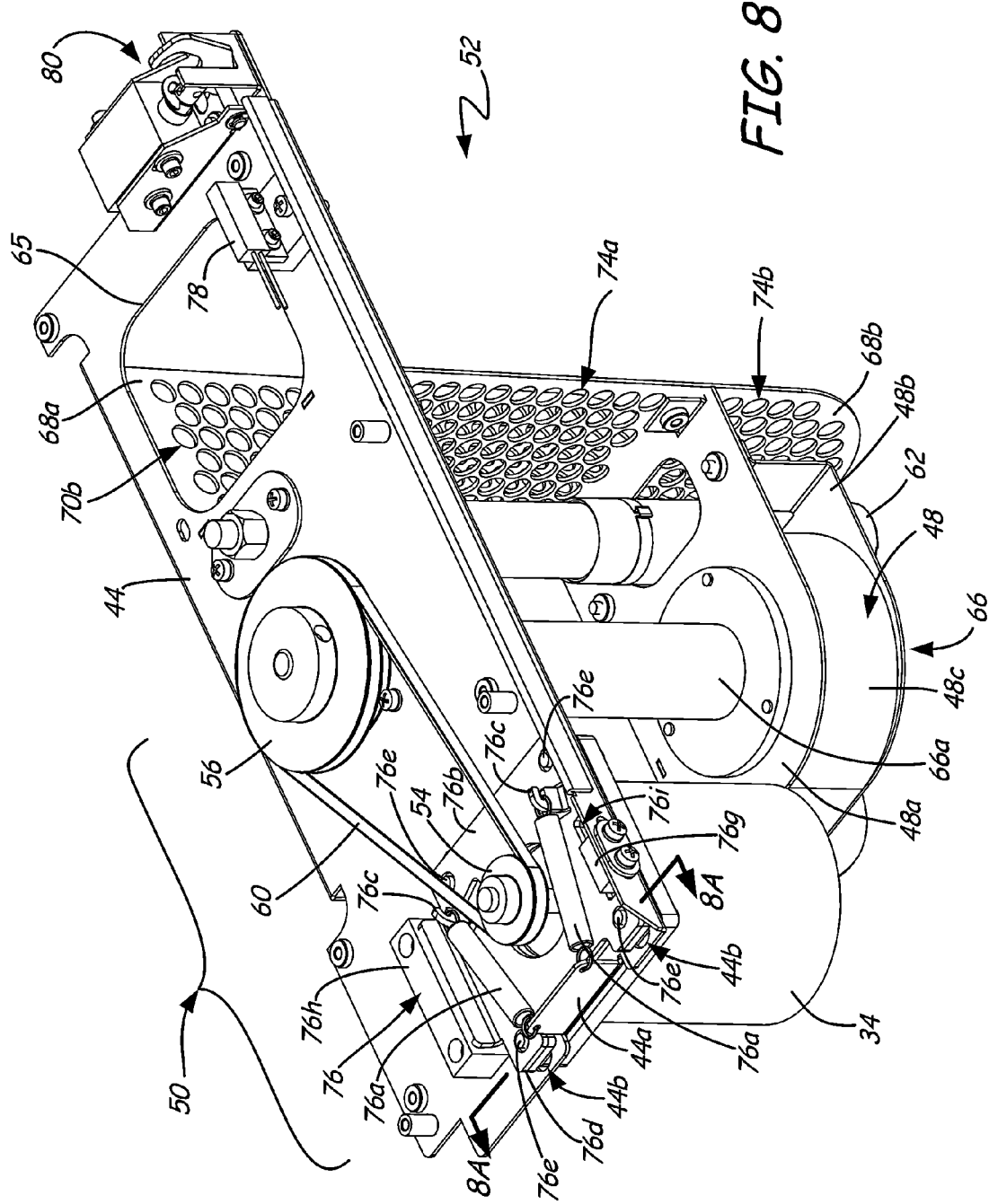

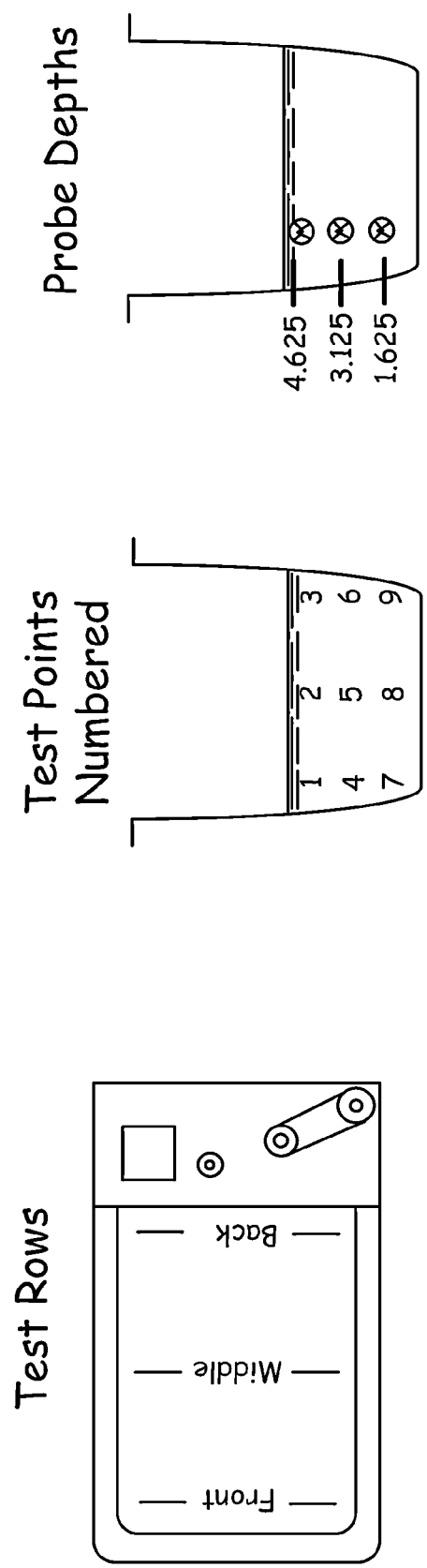

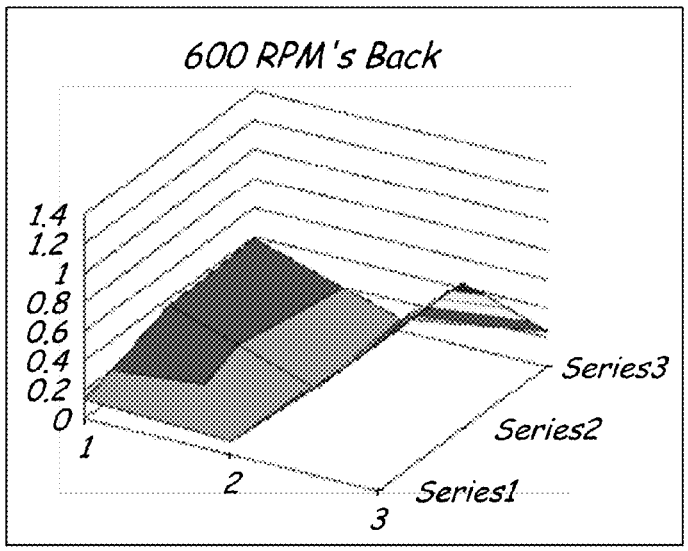
FIG. 24A
FIG. 24B
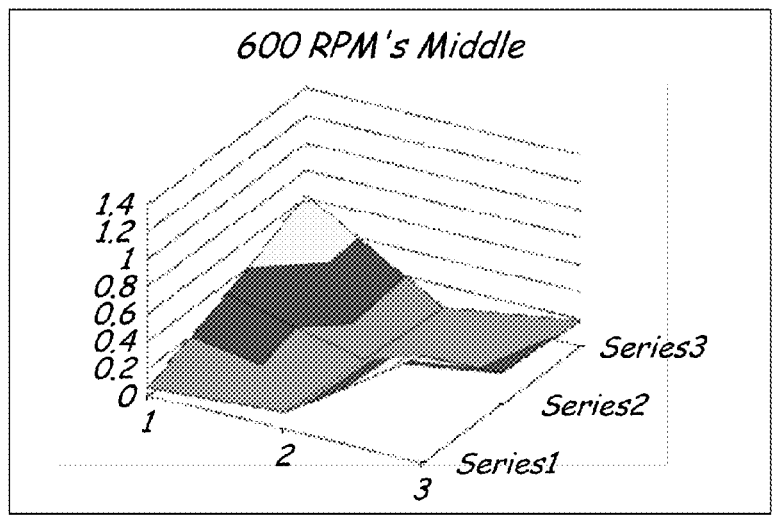
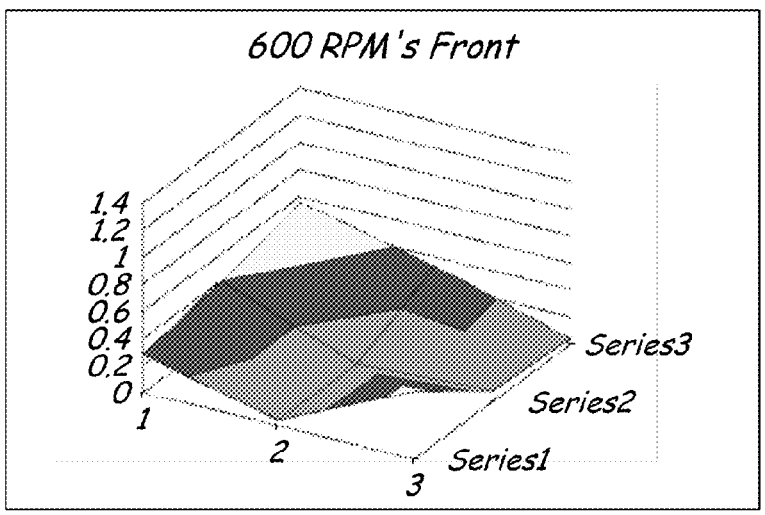
FIG. 24C

SUPPORT CLEANING SYSTEM

CROSS-REFERENCE TO RELATED APPLICATION(S)

This application is divisional of U.S. Ser. No. 12/984,937, filed on Jan. 5, 2011 and published as U.S. Publication No. 2011/0186081 A1 on Aug. 4, 2011, and entitled "Support Cleaning System", which was a non-provisional of U.S. Provisional Patent Application No. 61/335,327, filed on Jan. 5, 2010, and entitled "Support Removal Vessel"; and of U.S. Provisional Patent Application No. 61/292,228, filed on Jan. 5, 2010, and entitled "Support Removal Composition"; the disclosures of which are incorporated by reference in their entireties. Reference is also hereby made to co-filed U.S. Design patent application No. 29/382,577, entitled "Support Cleaning System", and filed on Jan. 5, 2011.

BACKGROUND

The present disclosure relates to additive manufacturing technologies for building three-dimensional (3D) models and support structures. In particular, the present invention relates to systems for removing support structures from 3D models built with additive manufacturing systems, such as extrusion-based additive manufacturing systems.

An extrusion-based additive manufacturing system (e.g., fused deposition modeling systems developed by Stratasys, Inc., Eden Prairie, Minn.) is used to build a 3D model from a digital representation of the 3D model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Support material is then deposited from a second nozzle pursuant to the generated geometry during the build process. The support material adheres to the modeling material during fabrication, and is removable from the completed 3D model when the build process is complete.

Support structures for use in building 3D models in digital manufacturing systems are typically classified in two categories: Break-away support materials and soluble support materials. Break-away support materials may be manually broken away from the resulting 3D models by hand or using tools. In comparison, soluble support materials may be dissolved in aqueous solutions, typically requiring heat and agitation for optimal dissolution.

SUMMARY

An aspect of the disclosure is directed to a support cleaning system that includes a tank disposed within a housing and having an interior volume for receiving a flowable solution, at least one porous barrier configured to separate the interior volume of the tank into multiple flow chambers, and a heater configured to heat flowable solution introduced into the tank. The multiple flow chambers include a first chamber configured to receive a three-dimensional model and a support structure, a second chamber configured to receive a support removal composition, and a third chamber retaining an impeller configured to circulate flowable solution through the first chamber, the second chamber, and the third chamber of the tank.

Another aspect of the disclosure is directed to a support cleaning system that includes a tank disposed within a housing and having an interior volume, a controller disposed at least partially within the housing, at least one porous barrier configured to separate the interior volume of the tank into multiple flow chambers, and an impeller having a first end disposed within the interior volume of the tank and a second end disposed outside of the interior volume of the tank. The multiple flow chambers include a first chamber configured to receive a three-dimensional model and a support structure, a second chamber configured to receive a support removal composition, and a third chamber retaining the impeller. The support cleaning system also includes a drive motor disposed outside of the interior volume of the tank and in signal communication with the controller, where the drive motor is configured to operate based on commands from the controller. The support cleaning system further includes an engagement mechanism disposed outside of the interior volume of the tank and engaged with the second end of the impeller, where the engagement mechanism is configured to relay rotational power from the drive motor to the impeller.

A further aspect of the disclosure is directed to an automated method for removing a support structure from a three-dimensional model built with a direct digital manufacturing system. The method includes providing a support cleaning system having a tank that is separated into multiple flow chambers by at least one porous barrier, inserting the three-dimensional model and the support structure into a first chamber of the multiple flow chambers, and introducing a support removal composition into a second chamber of the multiple flow chambers. The method also includes introducing a carrier medium into the tank such that the carrier medium flows through the at least one porous barrier to at least partially fill the multiple flow chambers, heating the carrier medium, and at least partially dissolving the support removal composition in the carrier medium to form a solution. The method further includes mechanically agitating the solution in a third chamber of the multiple flow chambers to create a flow of the solution through the first chamber, the second chamber, and the third chamber, and at least partially dissolving the support structure in the first chamber with the heated flowing solution.

BRIEF DESCRIPTION OF THE DRAWINGS

FIG. 8 is a top perspective view of the subassembly of the support cleaning system.

FIGS. 22A-22C are schematic illustrations a test setup for measuring velocity profiles in a support cleaning system.

FIGS. 24A-24C are graphical illustrations of second velocity profile test results in the support cleaning system shown in FIGS. 22A-22C for back, middle, and front locations, respectively.

DETAILED DESCRIPTION

The present disclosure is directed to a support cleaning system for removing soluble support structures from 3D models built with additive manufacturing systems, such as fused deposition modeling systems developed by Stratasys, Inc., Eden Prairie, Minn. The support cleaning system is configured to receive one or more 3D models, and to wash away soluble support materials from the 3D models by circulating a heated aqueous cleaning solution Examples of suitable soluble support materials and support structures for use with the support cleaning system of the present disclosure include those disclosed in Priedeman et al., U.S. Patent Application Publication No. 2005/0004282, and in Hopkins et al., U.S. patent application Ser. No. 12/508,725, and those commercially available under the trade designations "SR-10", "SR-20", and "SR-30" Soluble Supports from Stratasys, Inc., Eden Prairie, Minn. As discussed below, the support cleaning system is an environmentally friendly, self-contained, automated system that is easy to operate, provides increased safety features, and is suitable for use in an office setting or similarly situated environment.

Figure 1:
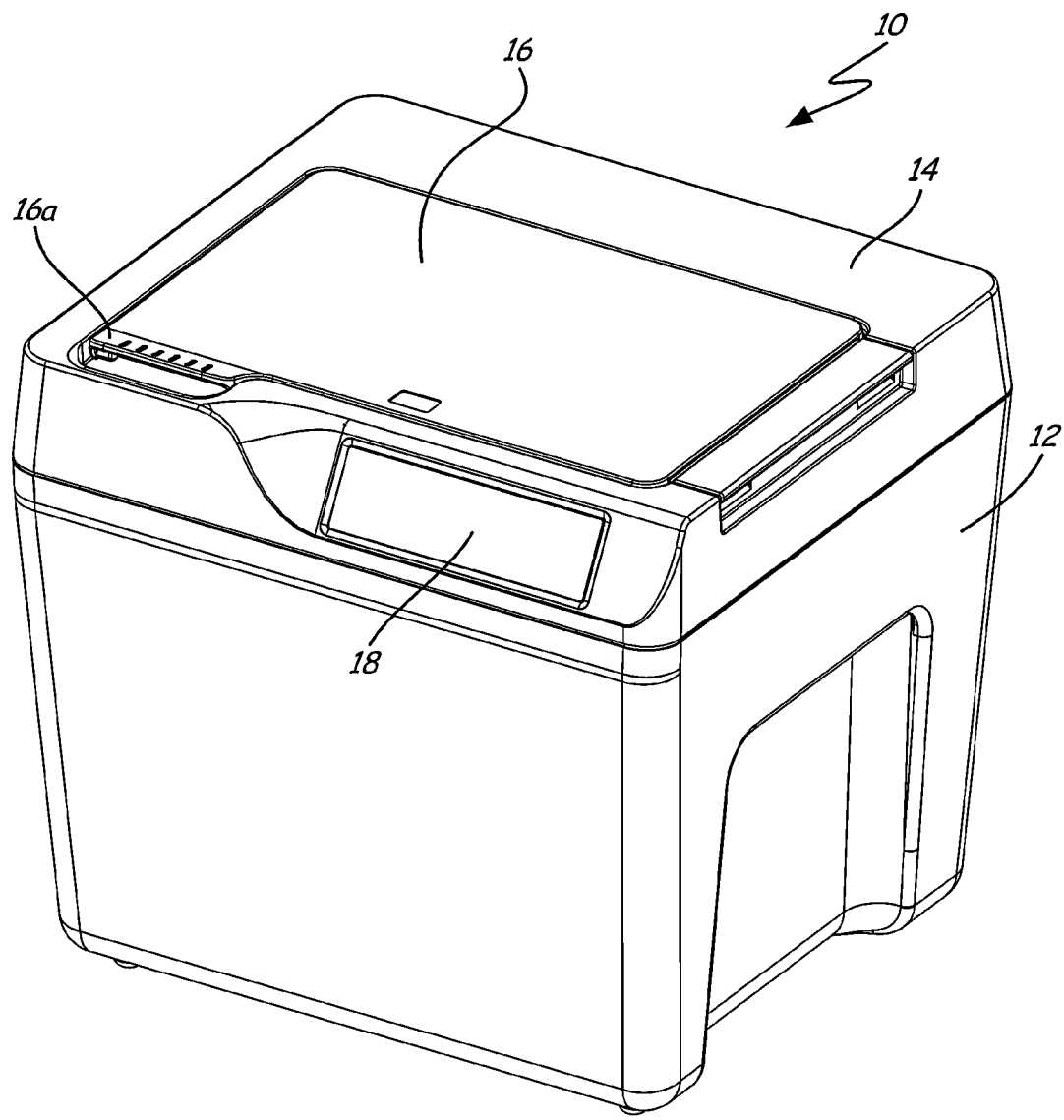
FIG. 1 is a top, front perspective view of a support cleaning system, where a lid of the support cleaning system is in a closed orientation.

FIG. 1 is a top perspective view of system 10, which is an example of a suitable support cleaning system of the present disclosure. As shown in FIG. 1, system 10 includes base housing 12, top housing 14, and lid 16, where base housing 12 and top housing 14 are secured together to encase the interior components of system 10 (not shown in FIG. 1). Top housing 14 includes control panel 18, which provides user controls for operating system 10. Base housing 12, top housing 14, and lid 16 may each be fabricated from a variety of materials, such as from one or more plastic and/or metallic materials, provided such materials are compatible with the aqueous cleaning solution used in the system 10 (typically falling within a pH range of 8 or above).

Figure 2A:
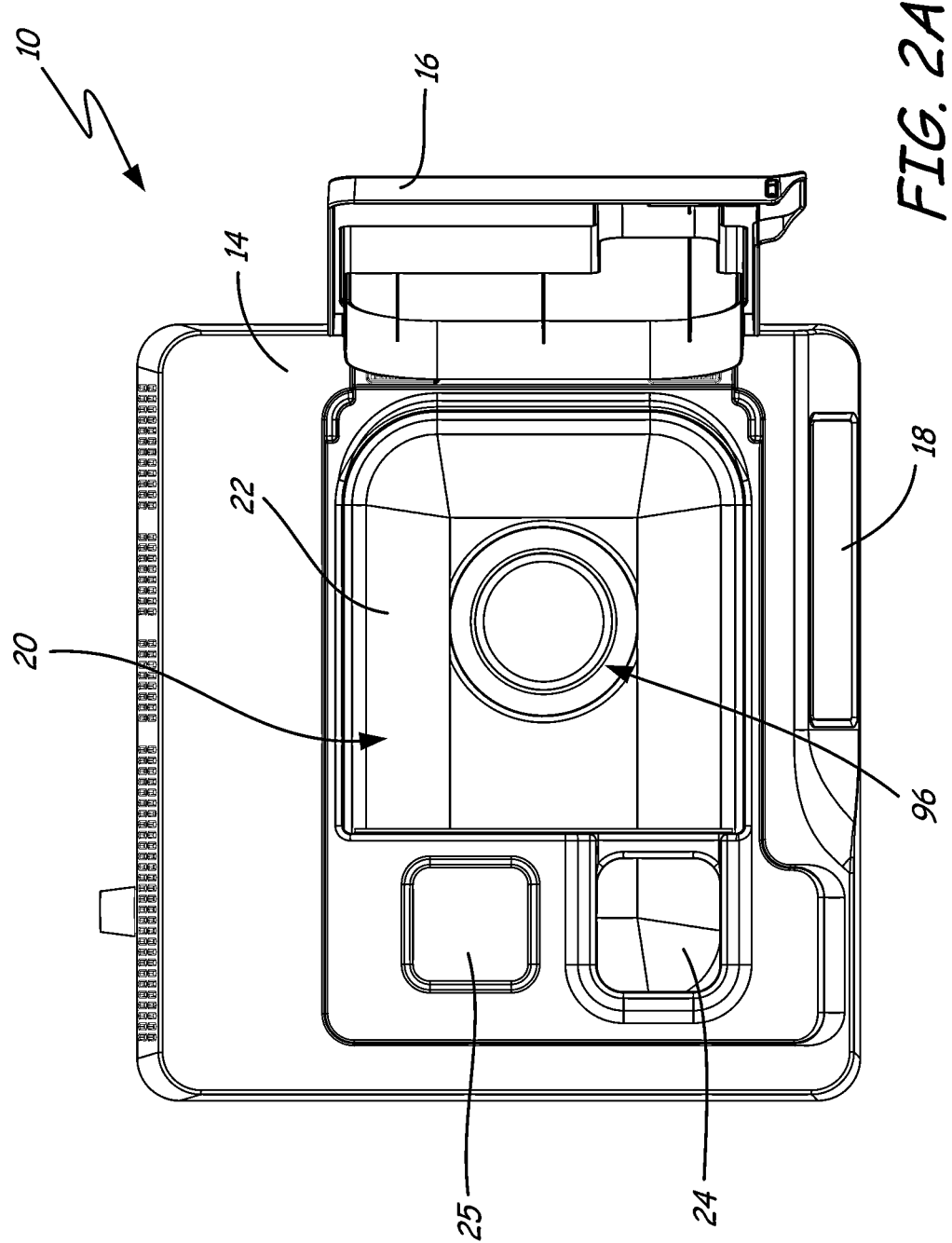
FIG. 2A is a top plan view of the support cleaning system, where the lid is open, showing a tank inside of the system.

FIG. 2A is a top plan view of system 10 where lid 16 is open, showing a tank 20 inside of the system 10. As discussed below, tank 20 is separated into multiple flow chambers, including reaction chamber 22, cleaning agent chamber 24, and an agitation chamber (not shown in FIG. 2A), where the agitation chamber is located below panel 25 of top housing 14. Prior to operation, tank 20 may be at least partially filled with an aqueous carrier medium (e.g., water). As discussed below, reaction chamber 22, cleaning agent chamber 24, and the agitation chamber are desirably separated by at least one porous barrier to allow fluids to flow between the multiple flow chambers. Tank 20 includes removable strainer 96 in reaction chamber 22 for catching and removing support material particles and debris from system 10.

Figure 2B:
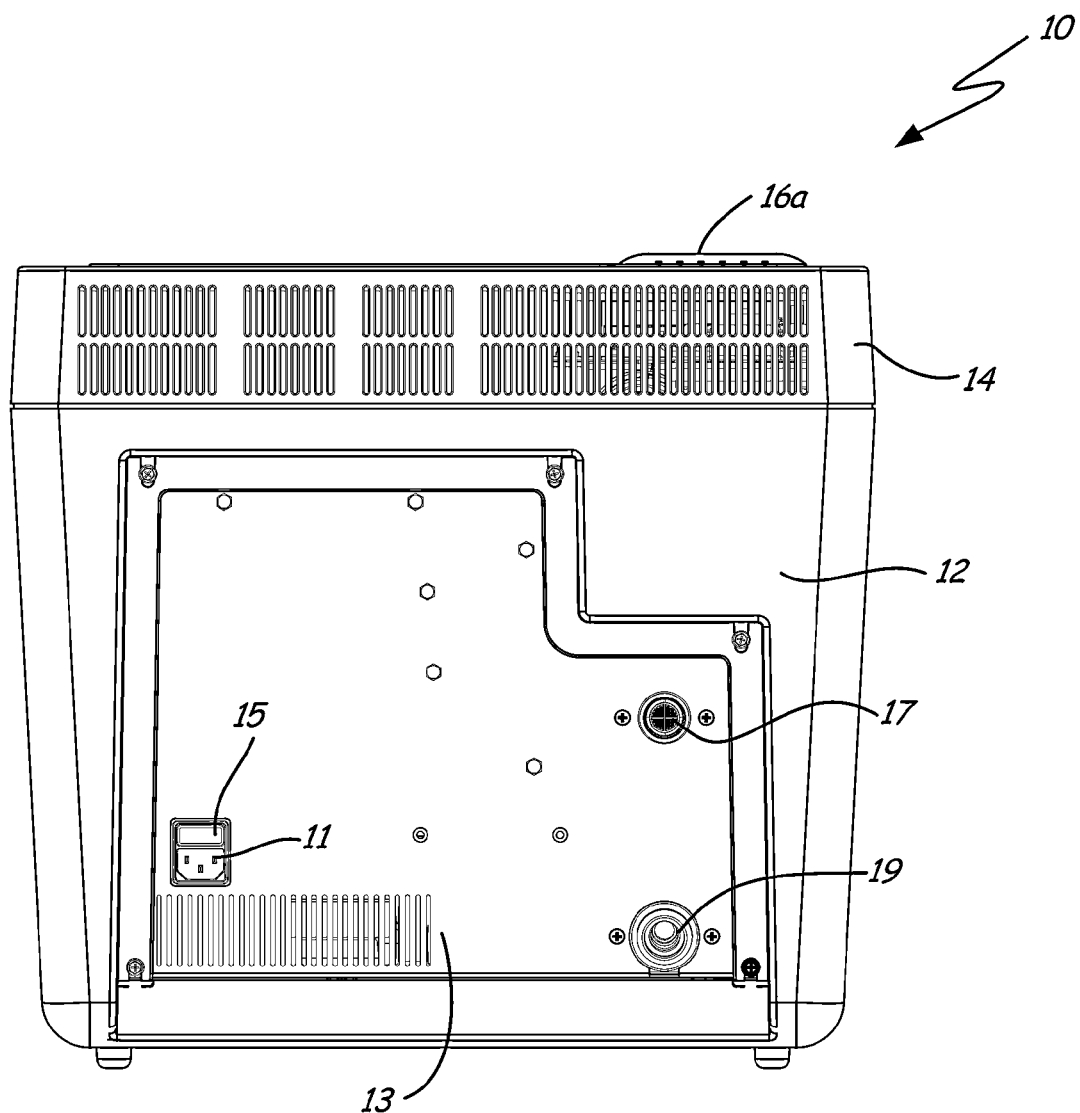
FIG. 2B is a rear elevation view of the support cleaning system.

FIG. 2B is a rear elevation view of system 10 showing back plate 13 which forms part of base housing 12. Back plate 13 includes power cord receptacle 11 for connecting system 10 to an external power source, power switch 15 for toggling system 10 on/off, inlet hose connection 17, and drain hose connection 19.

Figure 3:
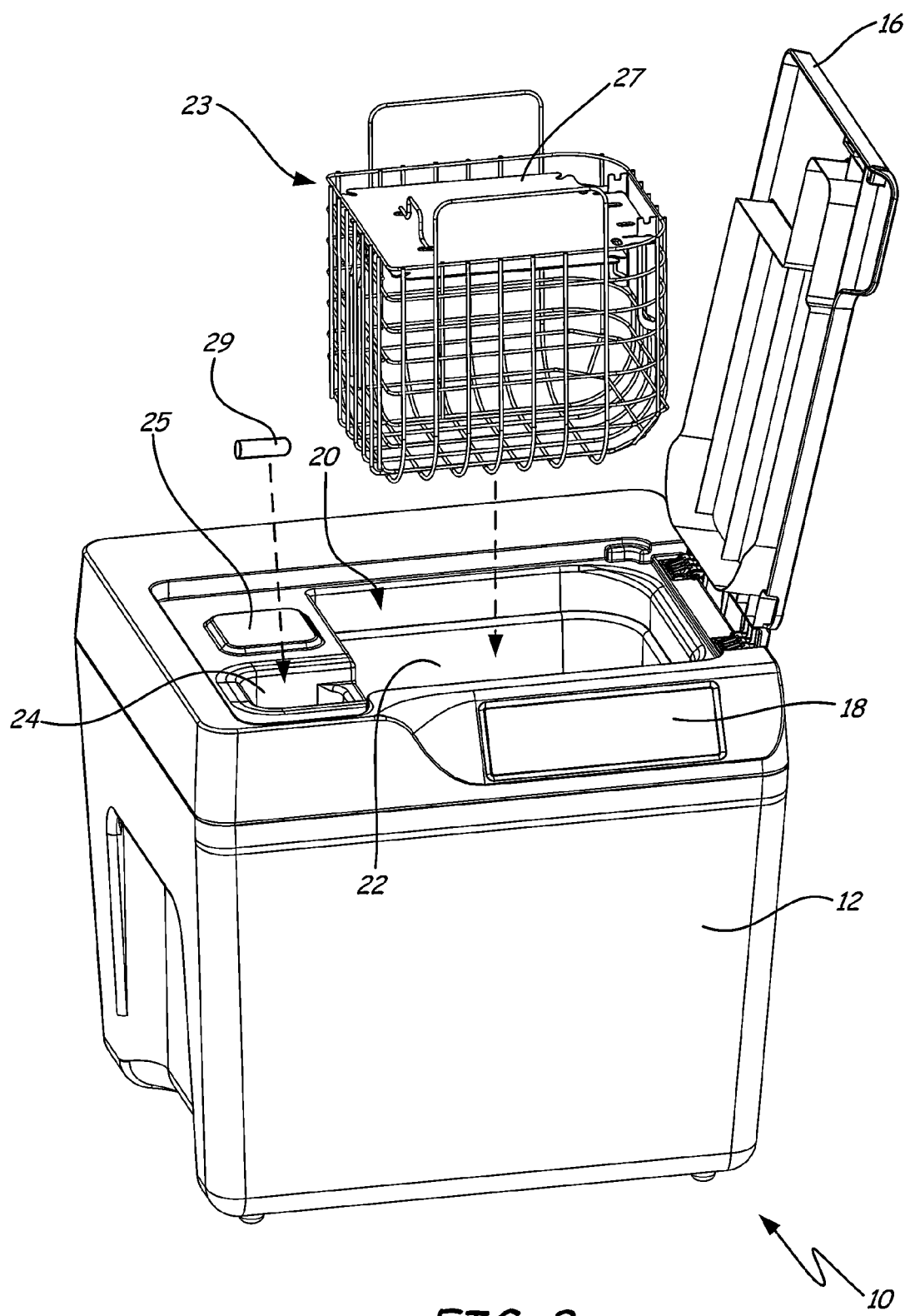
FIG. 3 is a top, side perspective view of the support cleaning system along with a basket and tablet for use in the system, where the lid is in an open orientation.
Figure 4:
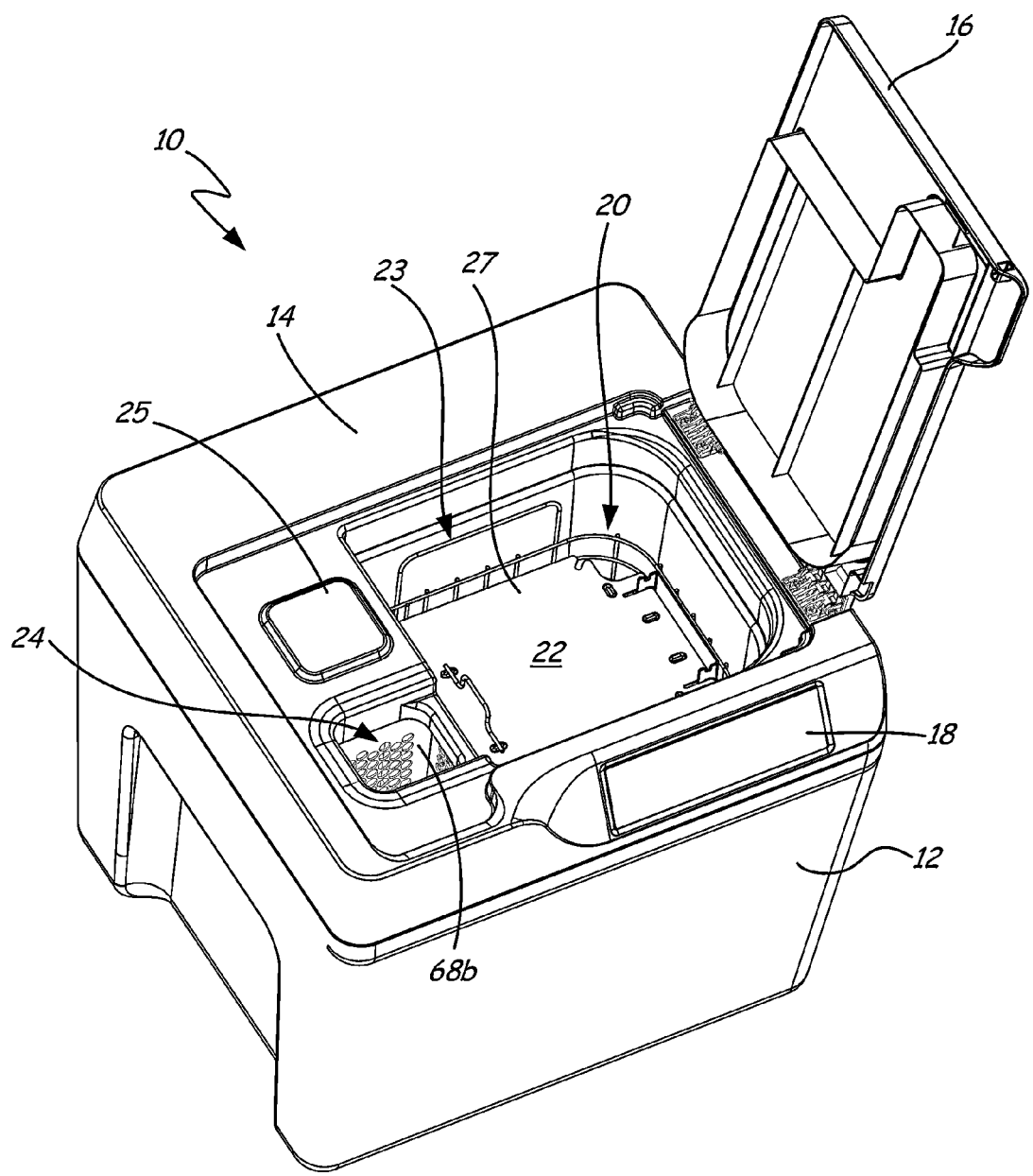
FIG. 4 is a top perspective view of the support cleaning system showing the basket inserted in the tank.

FIGS. 3 and 4 are perspective views of system 10 with lid 16 in an open orientation. As shown in FIGS. 3 and 4, lid 16 is pivotally connected to top housing 14 to allow access to the reaction chamber 22 and the cleaning agent chamber 24. As shown, reaction chamber 22 and cleaning agent chamber 24 are accessible through openings in top housing 14 when lid 16 is opened. In alternative embodiments, the lid may be moveable based on different mechanisms, such as sliding mechanisms, and separate lids or access doors may be provided for reaction chamber 22 and cleaning agent chamber 24. As discussed below, a controller of system 10 (not shown in FIGS. 3 and 4) is configured to detect whether lid 16 is closed, and may prevent system 10 from operating while lid 16 is an open orientation and conversely prevent lid 16 from opening while the system 10 is operating.

Reaction chamber 22 is a first chamber of tank 20 in which the 3D model and support structure are contained for the support removal operation. As shown in FIG. 3, in a preferred embodiment, a basket 23 is provided for securing the 3D model and its support structure (not shown) when the 3D model is placed in the tank 20 (shown in FIG. 4). The basket with its lid 27 ensure that the model remains both elevated in the tank 20 and submerged in the aqueous cleaning solution during the cleaning process, as discussed further below.

Cleaning agent chamber 24 is a second chamber of tank 20 in which a support removal composition may be added. As shown in FIG. 3, the support removal composition may be portioned for use in system 10 such as in exemplary tablet 29. In alternative embodiments, the support removal composition may be contained in a sealed pouch or multiple pouches (not shown) which may be ripped open to pour the support removal composition into the chamber 24, or a sealed pouch together with its contents may be deposited in the chamber 24 in cases where the pouch is dissolvable in the aqueous carrier medium. Alternatively, a liquid, or measured loose powder or pellets may be used in place of tablet 29. In other alternative embodiments, an automatic dispenser may be integral with system 10 for dispensing a portioned amount of the support removal composition in response to signals from a controller. Examples of suitable support removal compositions include those discussed below.

The support removal composition is at least partially dissolved in the aqueous carrier medium to provide an aqueous cleaning solution in tank 20 for dissolving and removing soluble support structures. As used herein, the term "solution", includes full solutions in which the support removal composition is fully dissolved in the aqueous carrier medium, and partial solutions in which the support removal composition is at least partially dissolved in the aqueous carrier medium. The aqueous carrier medium may include water and, optionally, one or more organic solvents. In one embodiment, the aqueous carrier medium consists essentially of water. As used herein, the term "fluid" may refer to either the carrier medium or the aqueous cleaning solution, and "aqueous cleaning solution" may refer to the solution along with dissolved support material.

Figure 5:
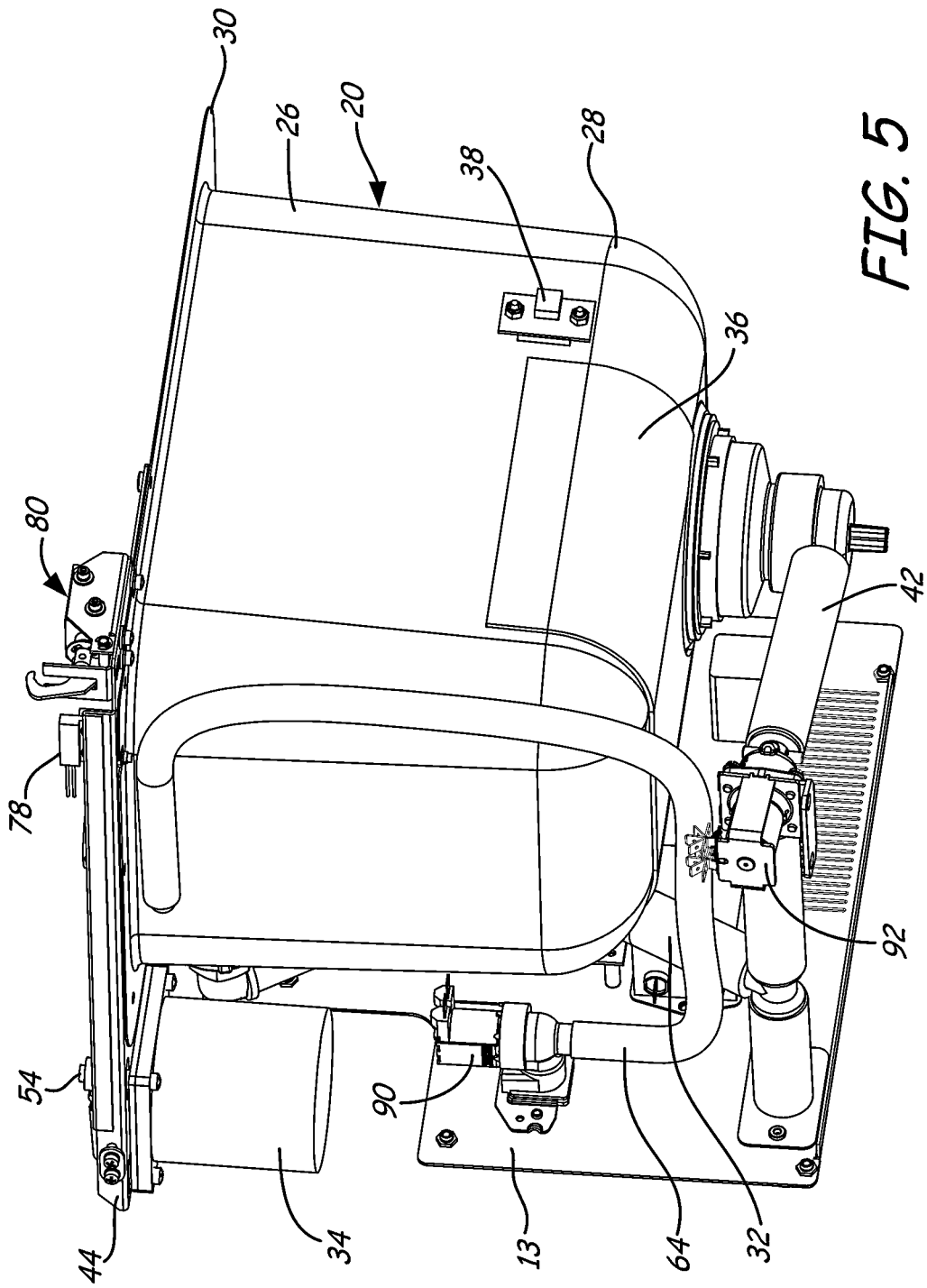
FIG. 5 is a bottom perspective view of the support cleaning system with housing removed to show the tank and related components of the support cleaning system.

FIG. 5 is a bottom perspective view of tank 20, where base housing 12, top housing 14, and lid 16 are omitted for ease of discussion. As shown, tank 20 includes sidewalls 26, base wall 28, and upper rim 30, which, in the shown embodiment, are formed as an integral component from one or more metallic and/or plastic materials. System 10 also includes overflow line 32, drive motor 34, heating element 36, temperature sensor 38, temperature switch 40, drainage line 42, mounting plate 44, inlet line 64, inlet valve 90, outlet valve 92 and strainer 96.

Drive motor 34 is a motor configured to rotate an impeller (not shown in FIG. 5) disposed in the agitation chamber of tank 20 (not shown in FIG. 5). Drive motor 34 is secured to mounting plate 44, which is correspondingly secured to tank 20, such as at rim 30. Drive motor 34 is located outside of the multiple flow chambers of tank 20, isolated from fluids in the system 10, and is in signal communication with the controller of system 10.

Heating element 36 is a heat-exchanging component configured to heat tank 20, and more desirably, the fluid retained in tank 20 during operation. In the shown embodiment, heating element 36 is a flat sheet heater secured to sidewalls 26 and base wall 28 (e.g., adhered to sidewalls 26 and base wall 28). An example of a suitable flat sheet heater for use with tank 20 includes a flat-sheet, circuit-encased, silicone heater. In alternative embodiments, system 10 may include multiple heating elements 36 of the same or differing dimensions to attain desired thermal profiles.

Temperature sensor 38 is secured to sidewalls 26 and is configured to monitor the temperature of the fluid in tank 20 during operation. In the shown embodiment, temperature sensor 38 is a primary sensor in signal communication with the controller of system 10 (not shown in FIG. 5), which responsively controls heating element 36, thereby allowing the temperature of the fluid in tank 20 to be maintained using process control techniques.

Temperature switch 40 (shown in FIG. 15) is a secondary sensor that is also desirably in signal communication with the controller of system 10 and/or with heating element 36, and functions as a backup shut-off switch when the temperature of the fluid in tank 20 exceeds a predetermined threshold temperature (e.g., above about 85° C.). As such, in the event of a malfunction of temperature sensor 38, heating element 36 may be shut off if the temperature of the fluid in tank 20 reaches the predetermined threshold temperature. This reduces the risk of damage to system 10 and/or the 3D model during operation.

Drain line 42 is a fluid line extending from back plate 13 through base wall 28 and is configured to drain the aqueous cleaning solution from tank 20 after a support removal operation is complete. Drain line 42 may be connected via drain hose connection 19 (shown in FIG. 2B) with fluid conduits external to system 10. Outlet valve 92 is configured along drain line 42 to open and close the line, to selectively drain fluid from tank 20. Drain line 42 also desirably includes removable strainer 96 (shown in FIG. 6), configured to prevent larger pieces of support material from passing into the drain line 42 in the event that they fail to fully dissolve after being removed from the 3D model. Overflow line 32 is a fluid line extending through one of sidewalls 26 and desirably prevents the carrier medium and cleaning solution from overflowing tank 20. FIG. 5 shows overflow line 32 connecting to drain line 42 downstream of outlet valve 92.

FIG. 5 also shows inlet line 64, a fluid intake line extending from back plate 13 through one of sidewalls 26. Inlet line 64 may be connected via inlet hose connection 17 (shown in FIG. 2B) to an external supply source to allow the carrier medium (e.g., water) to be introduced into tank 20. Inlet valve 90 is configured along inlet line 64 to open and close the line, selectively permitting flow of the carrier medium into tank 20. In alternative embodiments, inlet line 64 may be located at a variety of locations along sidewalls 26 or above rim 30.

Figure 6:
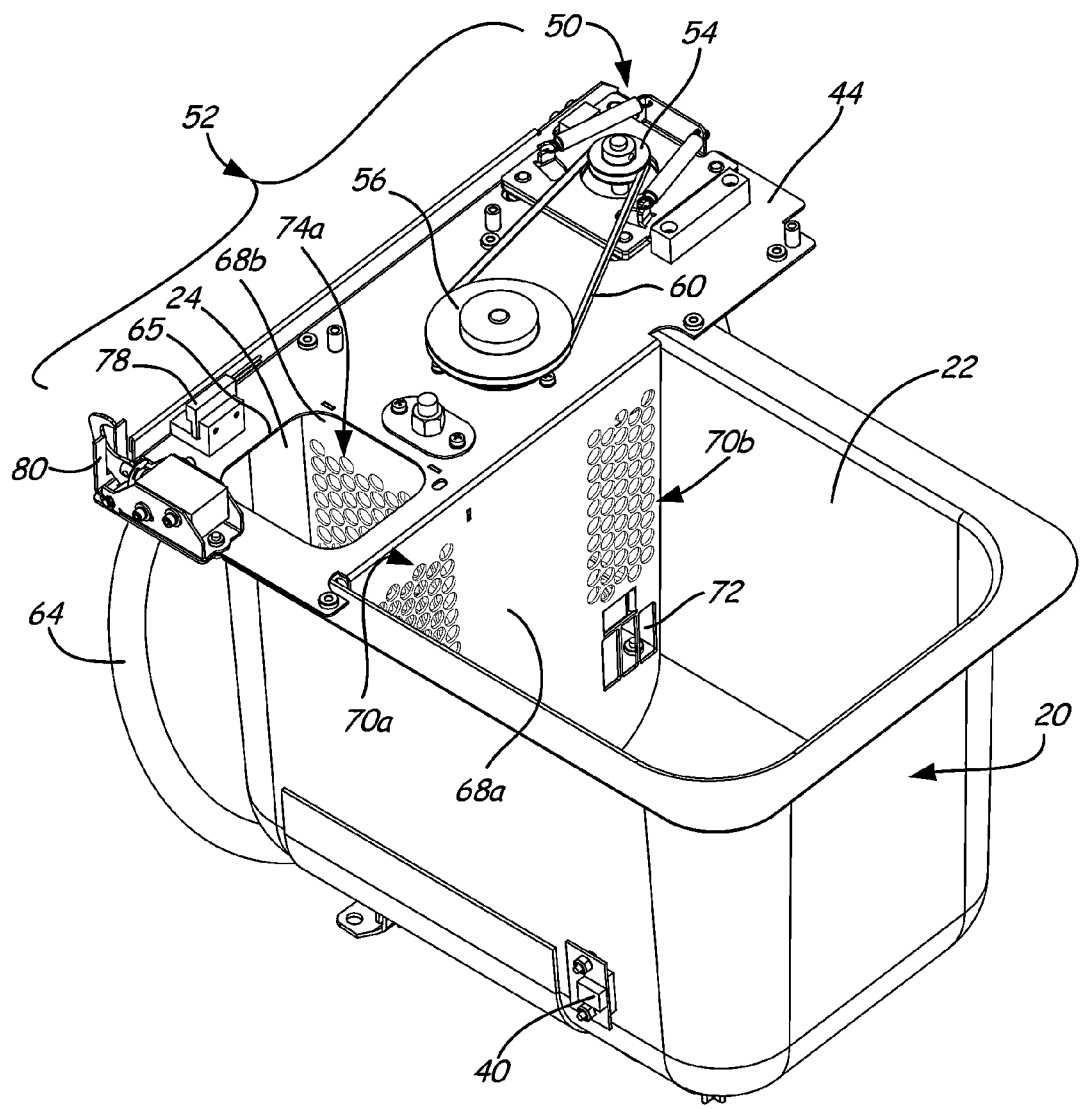
FIG. 6 is a top perspective view of the tank and related components, where the tank is shown in transparent detail.

FIG. 6 is a top perspective view of tank 20 and related components, where base housing 12, top housing 14, and lid 16, and fluid lines are omitted for ease of discussion. As shown in FIG. 6, system 10 includes subassembly 52 disposed in tank 20. Subassembly 52 includes mounting plate 44 and porous barriers 68a and 68b, which divide tank 20 into reaction chamber 22, cleaning agent chamber 24, and agitation chamber 46. Agitation chamber 46 is located adjacent to reaction chamber 22 and cleaning agent chamber 24, and retains impeller 66 (not shown). In the shown embodiment, reaction chamber 22 is separated from cleaning agent chamber 24 and agitation chamber 46 by porous barrier 68a, and cleaning agent chamber 24 is separated from agitation chamber 46 by porous barrier 68b. As shown, porous barrier 68a and porous barrier 68b each have one or more sets of perforations through which fluid may flow, however, in alternative embodiments, reaction chamber 22, cleaning agent chamber 24, and agitation chamber 46 may be separated by one or more alternative porous barrier configurations, such as screens, or by a combination of barrier configurations. Mounting plate 44 caps agitation chamber 46, and includes opening 65 above cleaning agent chamber 24 through which the support removal composition may be added.

Figure 7:
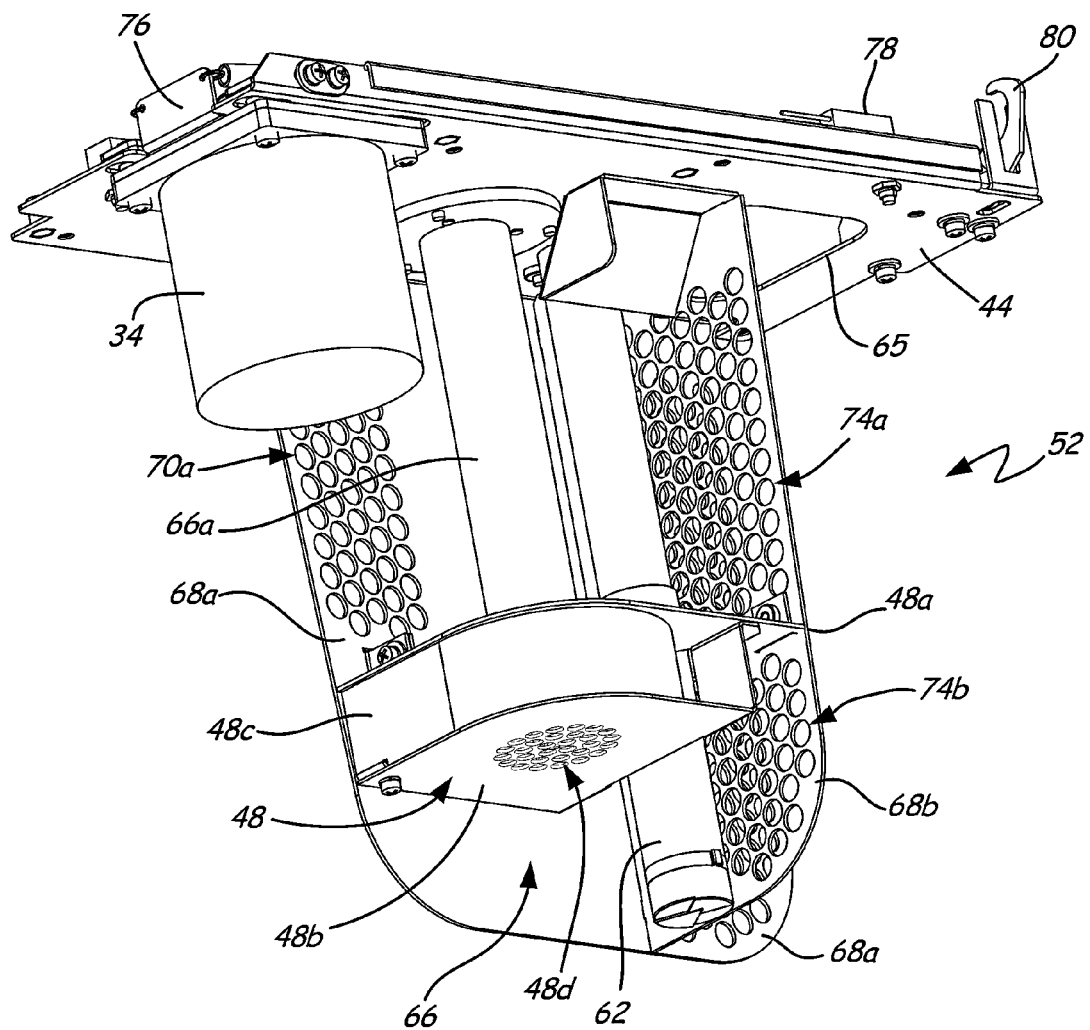
FIG. 7 is a bottom perspective view of a subassembly of the support cleaning system, configured to be secured inside of the tank.
Figure 8A:
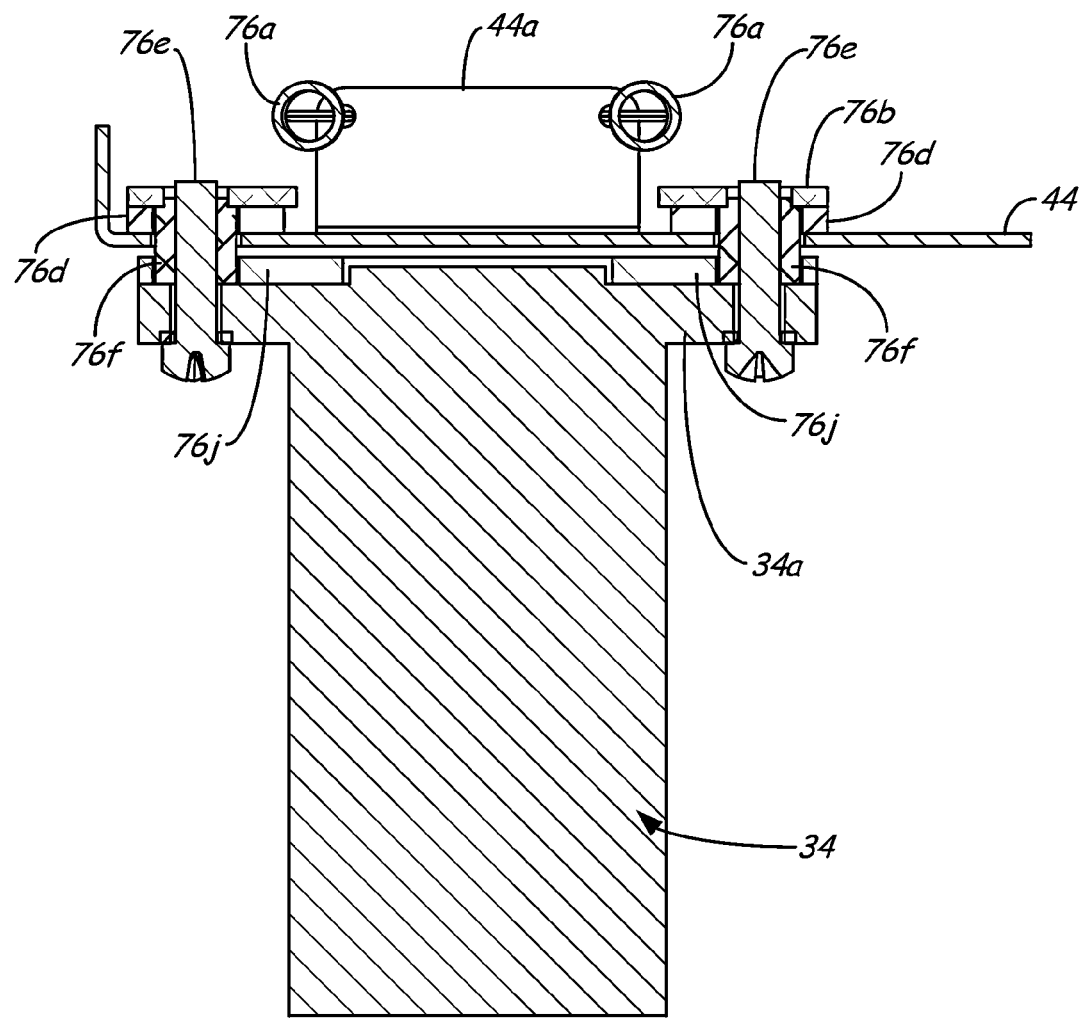
FIG. 8A is a sectional view of the subassembly taken along line 8A-8A of FIG. 8.
Figure 9:
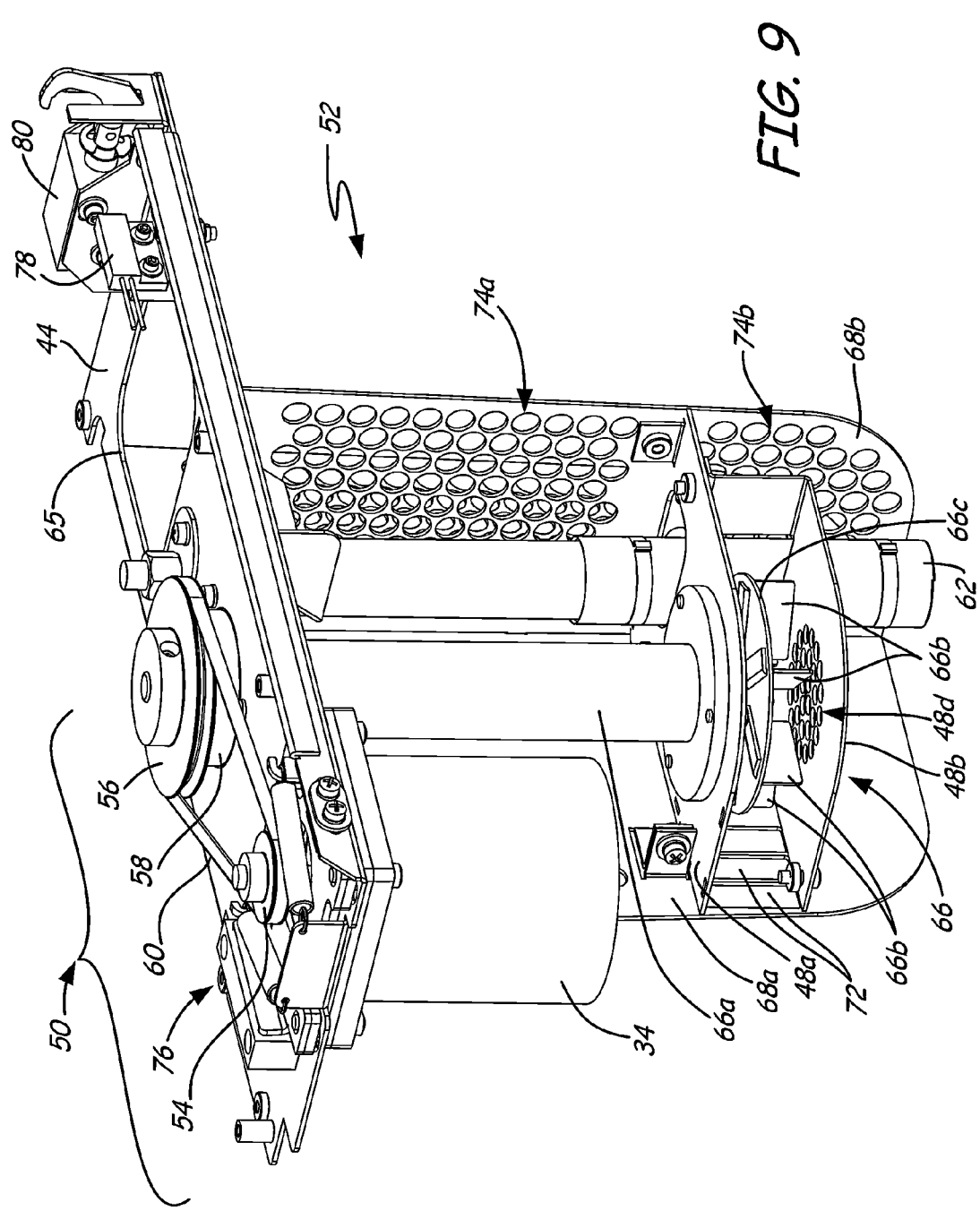
FIG. 9 is a side perspective view of the subassembly of the support cleaning system, where an impeller side housing of the subassembly is shown in transparent detail.

FIGS. 7-9 further illustrate subassembly 52 configured to be secured to tank 10. As shown, subassembly 52 includes pulley assembly 50, impeller 66 and level sensor 62, as well as drive motor 34, mounting plate 44, and porous barriers 68a and 68b, discussed above. Impeller 66 having shaft 66a, blades 66b and housing 48, is contained within agitation chamber 46. Shaft 66a extends down through mounting plate 44, terminating in blades 66b mounted on rotary disc 66c (shown in FIG. 9, in which barrier 48c is omitted for ease of discussion). Housing 48, which includes top plate 48a, bottom plate 48b, and side plate 48c, encases blades 66b and stabilizes impeller 66 in a vertical orientation within tank 20. Top plate 48a is oriented in a horizontal plane and is secured to porous barriers 68a and 68b. Bottom plate 48b is oriented in a horizontal plane and is secured on one side to porous barrier 68a, and on another by way of a vertical tab to top plate 48a. A lower end of shaft 66a extends through top plate 48a of impeller housing 48 (e.g., with a bushing assembly). In alternative embodiments, impeller housing 48 may have innumerable different configurations, for example, housing 48 and top plate 48a may be separate components. Impeller 66 is driven by drive motor 34 and pulley assembly 50, which rotate shaft 66a and attached disc 66c carrying blades 66b. Impeller 66 provides agitation for cleaning the 3D model by generating high-velocity flows of aqueous cleaning solution into reaction chamber 22.

In the shown embodiment, level sensor 62 is also secured to mounting plate 44, and extends downward through impeller housing 48. Level sensor 62 is a fluid level sensor configured to monitor the fluid level in tank 20, and may be a float sensor, an inductive sensor, a capacitive sensor, or other alternative sensors capable of monitoring fluid level and signaling a detected level. As discussed below, system 10 may be operated with different load sizes. As such, level sensor 62 may be used to identify when desired amounts of the carrier medium are introduced into tank 20.

In the view shown in FIG. 7, reaction chamber 22 is on the back side of barrier 68a, cleaning agent chamber 24 is located on the front side of barrier 68a and on the right side of barrier 68b, and agitation chamber 46 is located on the front side of barrier 68a and on the left side of barrier 68b. As discussed above, barriers 68a and 68b are porous barriers, such that fluids may flow between reaction chamber 22, cleaning agent chamber 24, and agitation chamber 46. In particular, barrier 68a includes perforations 70a between reaction chamber 22 and cleaning agent chamber 24, perforations 70b between reaction chamber 22 and an upper portion of agitation chamber 46 (above impeller housing 48), and a set of three slots 72 between reaction chamber 22 and a lower portion of agitation chamber 46 (adjacent impeller housing 48). Similarly, barrier 68b includes perforations 74a between cleaning agent chamber 24 and an upper portion of agitation chamber 46 (above top plate 48a), and perforations 74b between cleaning agent chamber 24 and a lower portion of agitation chamber 46 (below top plate 48a). Barriers 68a and 68b also desirably have dimensions that conform to sidewalls 26 and base wall 28 of tank 20. Moreover, as discussed below, barrier 68a is desirably non-porous below bottom plate 48b, thereby restricting the flow of the fluid out of the lower portion of agitation chamber 46 to a flow path through slots 72.

As shown in FIGS. 7 and 9, impeller housing 48 includes perforations 48d on its bottom plate 48b, thereby providing a pump intake for impeller 66 to draw fluid up into impeller housing 48. The fluid flow velocity of the drawn fluid is accelerated to high velocities by the rotation of blades 66b. The drawn fluid is pumped through slots 72 of barrier 68a into reaction chamber 22 by the rotation of blades 66b. The tank arrangement allows impeller 66 to function as an impeller pump that directs the fluid into reaction chamber 22 via slots 72 at high flow velocities. The opening in barrier 68a at slots 72 channels the high velocity fluids into reaction chamber 22. Typically, the current that is generated will also draw the fluid into the upper portion of agitation chamber 46 from cleaning agent chamber 24, and allow the fluid to exit from the upper portion of agitation chamber 46 into reaction chamber 22 (via perforations 70b).

During operation of system 10, the support removal composition may be introduced into cleaning agent chamber 24 and the carrier medium may be introduced into tank 20 via inlet line 64 (shown in FIG. 5). When impeller 66 is rotatably driven (via drive motor 34 and pulley assembly 50), fluid is channeled in a flow path up through perforations 48d of impeller housing 48. This channels the fluid flow in a flow path up through impeller housing 48 and out through slots 72. The drawing of the fluid into impeller housing 48 generates a current that draws the fluid from cleaning agent chamber 24 (via perforations 74a and 74b). This correspondingly draws the fluid into cleaning agent chamber 24 from reaction chamber 22 (via perforations 70a). In the shown embodiment, fluid may flow between upper and lower portions of agitation chamber 46 through openings in housing top plate 48a. Similarly, fluid may flow between reaction chamber 22 and the upper portion of agitation chamber 46 via perforations 70b. The perforations inhibit the passing of small 3D parts and residual support material into the agitation chamber 46 and impeller housing 48, yet allow continuous flow of the cleaning solution in the tank 20 to encourage high flow velocities in reaction chamber 22. In alternative embodiments, the upper portion of agitation chamber 46 may be sealed or substantially sealed from fluid flow (i.e., perforations 70b and 74b may be omitted), and the openings may be omitted from top plate 48a.

The arrangement of system 10 provides seclusion of level sensor 62 and impeller 66 from the regions of tank 20 that are accessible to a user (i.e., reaction chamber 22 and cleaning agent chamber 24). This prevents accidental user contact with either level sensor 62 or impeller 66 during operation, and also prevents interference with these components by the 3D models/support structures or by tablet 29 or other support removal composition carrier.

As mentioned above, impeller 66 is rotatably driven by drive motor 34 and pulley assembly 50, which are best shown in FIGS. 8 and 9. Pulley assembly 50 includes pulley 54 secured to a drive shaft of drive motor 34, pulley 56 secured to shaft 66a of impeller 66 with bearing assembly 58, belt 60 which engages pulleys 54 and 56 to transfer rotational power of drive motor 34 to impeller 66, and tensioner assembly 76 coupled to drive motor 34 which slides back and forth by spring force to maintain a nearly constant tension in belt 60. This arrangement above mounting plate 44 allows the engagement between impeller 66 and pulley assembly 50 to be located above and outside of the interior volume of tank 20. The arrangement of drive motor 34 and impeller 66 allows drive motor 34 to operably engage the impeller above the fluid level in tank 20, precluding the need for a seal through sidewalls 26 or base wall 28 to accommodate impeller 66.

FIG. 8A is a detailed sectional view of tensioner assembly 76 on mounting plate 44. In the shown embodiment, tensioner assembly 76 includes a pair of extension springs 76a which are connected on one end to a top plate 76b by a pair of hooks 76c, and connected on an opposite end to a vertical tab 44a of mounting plate 44. Tensioner assembly 76 further includes a sliding plate 76d, formed of Teflon or other low-friction material, a set of four fasteners 76e, a set of four spacers 76f, stopper 76g, guide member 76h, and buffer plate 76j. Sliding plate 76d is immovably coupled to an underside of top plate 76b by fasteners 76e, and slidably connects to a top surface of mounting plate 44. Buffer plate 76j is an optional plate formed of Teflon or other low-friction material which is coupled to a top flange 34a of motor 34. Spacers 76f are tubular members fastened by welding or other similar means to the underside of top plate 76b. Fasteners 76e extend through the center of spacers 76f and through a set of four mating slots 44b of mounting plate 44, and further connect to top flange 34a of motor 34. Spacers 76f are configured so as to provide a gap between buffer plate 76j coupled to motor 34 and an underside of mounting plate 44. Stopper 76g and guide member 76h are mounted in parallel to top plate 44, flanking plates 76b and 76d on either side thereof. In this configuration, sliding plate 76d carrying motor 34 and top plate 76b is slidable between stopper 76g and guide member 76h in a back and forth motion on mounting plate 44. Buffer plate 76j provides a safeguard against possible tilting or misalignment of motor 34, ensuring a slidable surface in the event of incidental contact with the underside of mounting plate 44. The distance that tensioner assembly 76 carrying motor 34 travels is constrained by the length of slots 44b and by the length of a slot 76i in plates 76b and 76d, which engages stopper 76g. Stopper 76g engaged in slot 76i additionally provide a forward stop that assists in maintaining tension on belt 60 during shipping or other transport of system 10, so that belt 60 does not loosen and slip off of its pulleys.

In operation of pulley assembly 50, a constant tension is maintained in belt 60 by springs 76a allowing back and forth movement of tensioner assembly 76 carrying drive motor 34 (and pulley 54). Grounded on one end to tab 44a and movable in a back and forth direction at the other end by sliding of plate 76d, springs 76a expand when the tension in belt 60 increases, and contract when the tension in belt 60 decreases, thereby maintaining equilibrium in the assembly without the use of an idler pulley. In this manner, tensioner assembly 76 serves to maintain an approximately constant tension in belt 60, even as belt 60 may stretch with use over time. This embodiment is advantageous, in that it eliminates noise and wear associated with use of an idler. In alternative embodiments, the pulley mechanism may have different configurations, for example, a third pulley may be used as an idler, and tensioner assembly 76 may be omitted or may take alternate forms.

As best shown in FIGS. 10-13, basket 23 together with its detachable lid 27 hold the 3D model/support structure in reaction chamber 24 while the 3D model undergoes support removal. Basket 23 elevates the 3D model/support structure in the reaction chamber 22 so that the aqueous cleaning solution can flow freely around all of its surfaces. It also prevents damage to the 3D model from high flow velocities of the aqueous cleaning solution. Basket 23 is configured to allow adjustment of lid 27 to either an upper position (shown in FIG. 12) for larger models, or a lower position (shown in FIG. 13) for smaller models.

Basket 23 has perforated walls and bottom to allow continuous flow of the cleaning solution to the 3D model/support structure, a hinge base member 23a having parallel C-shaped guide slots for connecting to lid 27 at either the upper or lower lid position, a pair of upward-oriented handles 23b, and upper and lower lid rests 23c and 23d for supporting a leading edge of lid 27 in either the upper or a lower lid position. Lid 27 rotates from a vertical, open position to a horizontal, closed position, and includes a handle 27a to facilitate listing and lowering by a user. Lid 27 further includes an elongated pin 27c configured to link lid 27 to hinge base member 23a of basket 23, a pair of slots 27b configured to slide over hinge base member 23a, and a closure tab 27d at its leading edge configured to mate with lid rest 23c or 23d. The user selects a lid position based on the size of the model or models to be cleaned. The upper lid position is used for larger models, and the lower lid position is used for smaller size models. Many models may be cleaned at one time so long as they are submerged during the cleaning process with the basket lid 27 in either position.

Figure 10:
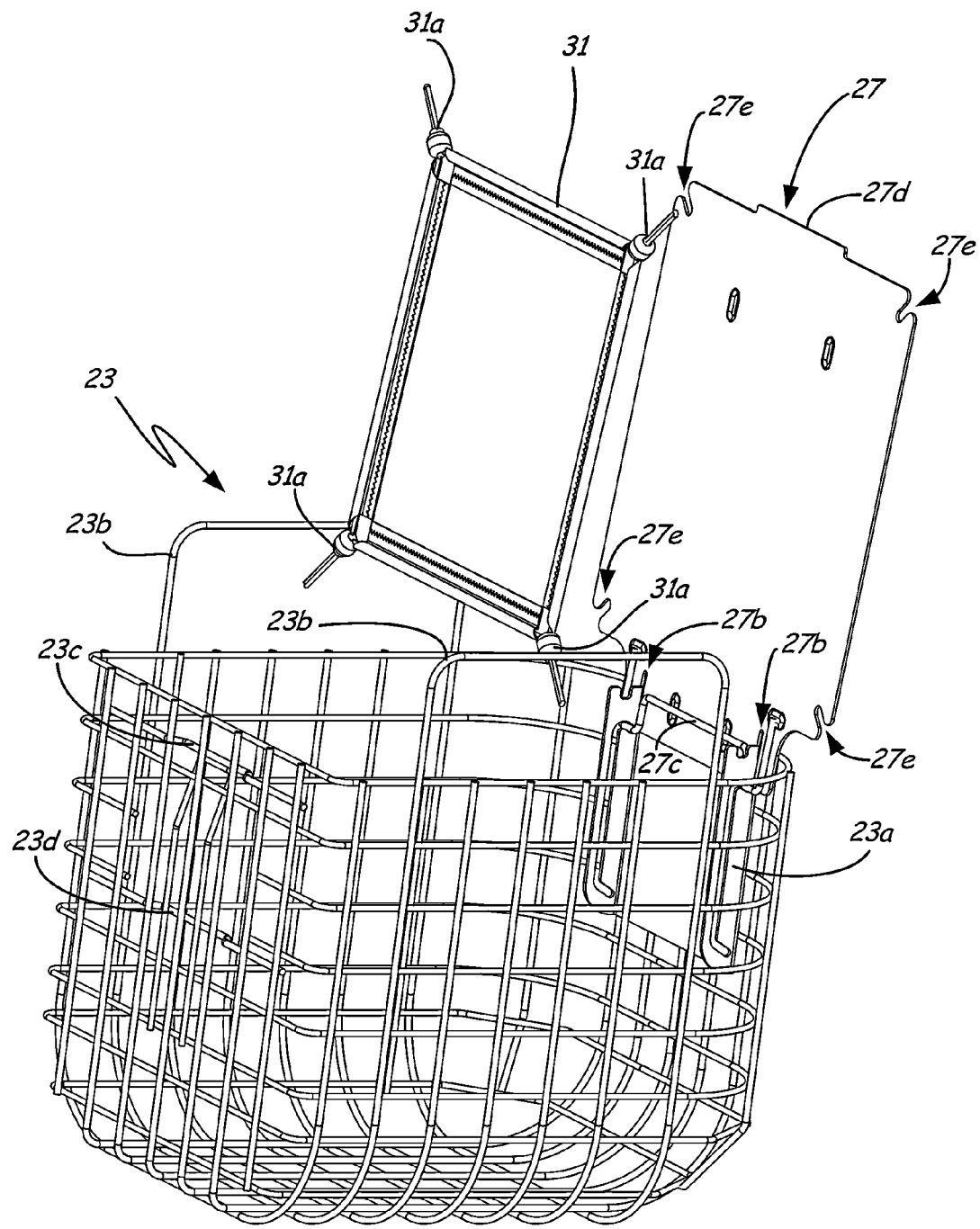
FIG. 10 is an exploded, side perspective view of the basket for use in the support cleaning system, shown with an optional model retention net.
Figure 11:
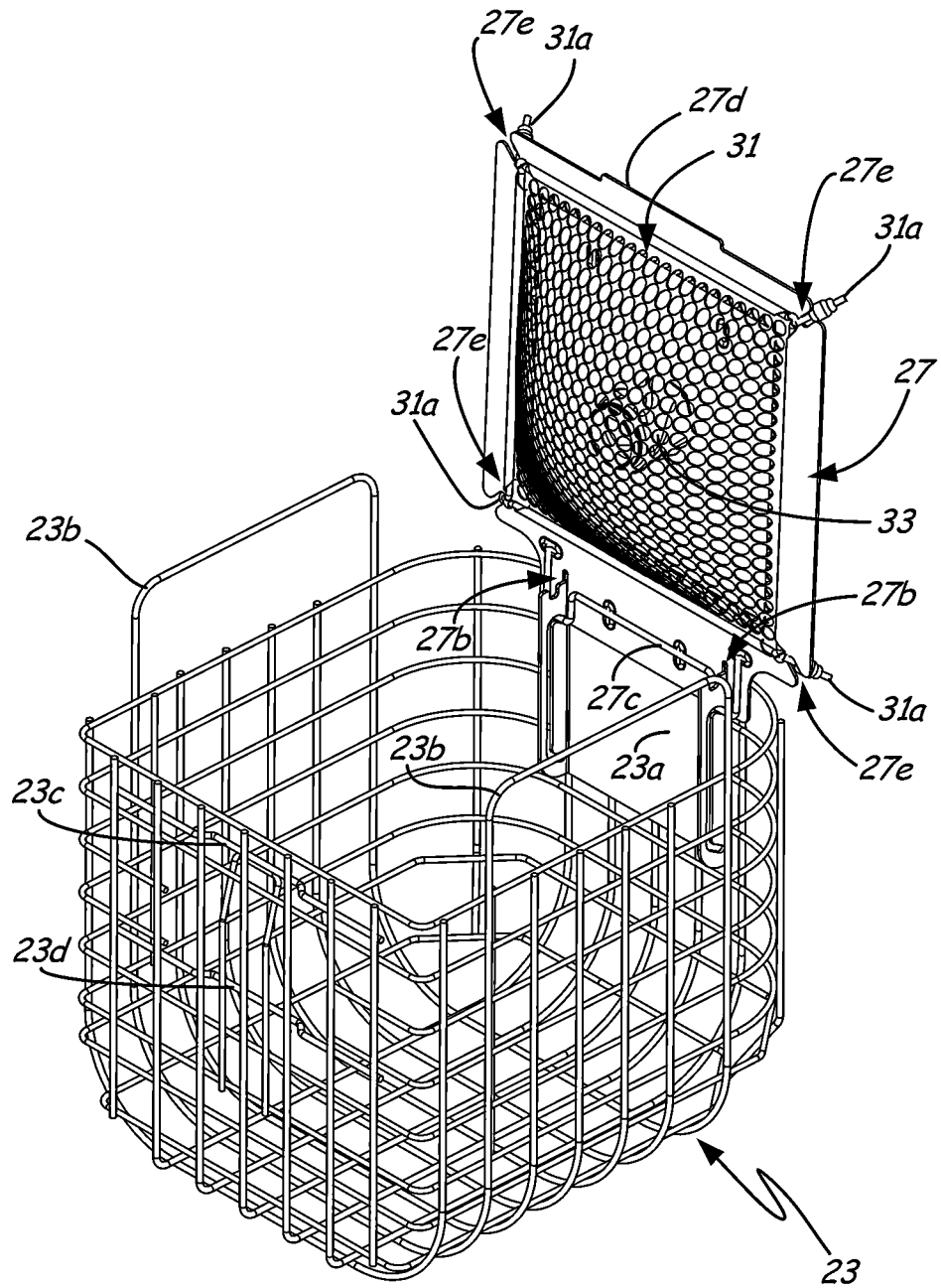
FIG. 11 is a side perspective view of the basket in an open orientation and showing a model held by the optional net.
Figure 12:
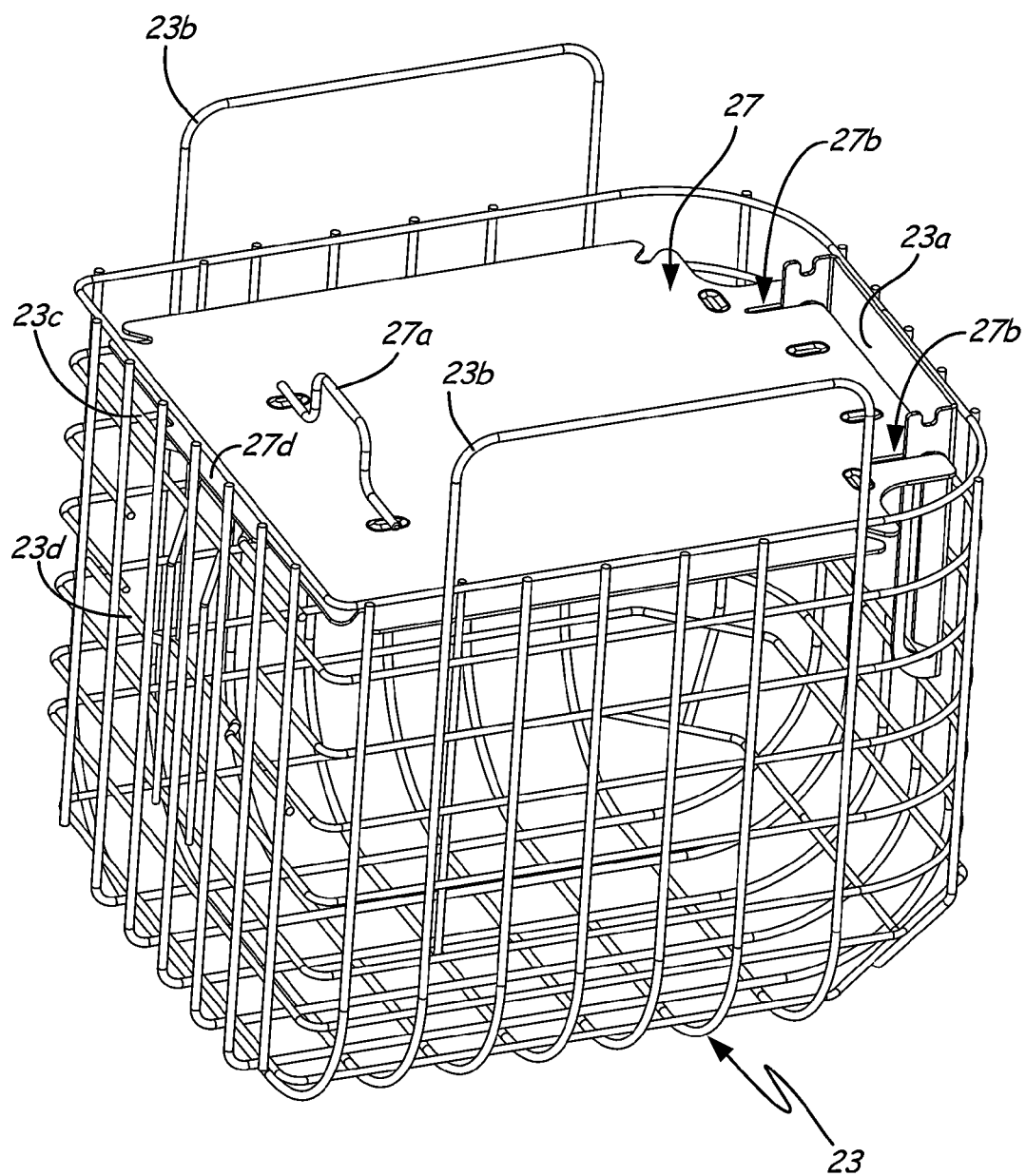
FIG. 12 is a top perspective view of the basket in a closed, upper lid position.
Figure 13:
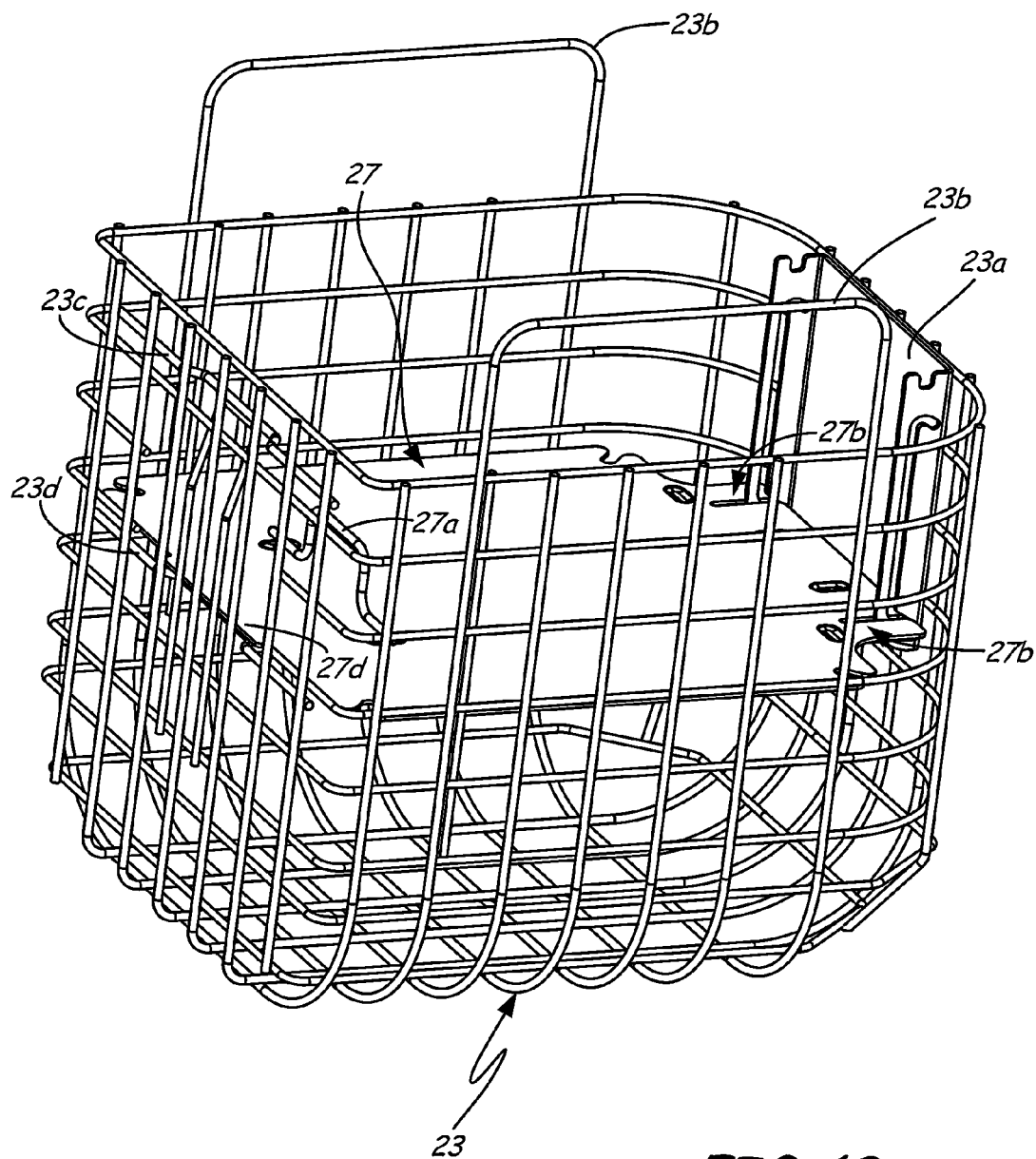
FIG. 13 is a side perspective view of the basket in a closed, lower lid position.

For delicate and relatively flat 3D models, an optional retention net 31 is provided (shown in FIGS. 10 and 11). Net 31 is a rectangular mesh net having elastic edges and an elastic tab 31a located in each of its four corners, and is sized to attach to an interior surface of lid 27. In the shown embodiment, lid 27 includes a notch 27e in each of its four corners, each notch 27e configured to receive one of elastic tabs 31a. As illustrated in FIG. 11, an exemplary 3D model 33 is retained in net 31 by placing model 33 between net 31 and lid 27, and hooking each elastic tab 31a into the respective notch 27e of lid 27. Additional 3D models can by placed in the net 31 if space allows. Lid 27 is closed with net 31 attached, preferably in its lower position, and without placing other models in basket 23.

In an alternate embodiment, basket 23 with its lid 27 may be omitted and the 3D model/support structure placed directly into tank 20. In a further alternate embodiment, basket 23 may be omitted while a lid such as lid 27 is integrated into the tank. For example, lid 27 may be coupled to an inner wall of tank 20 by a hinge such as hinge 23a of basket 23. In such embodiment, the 3D model/support structure may be placed in to tank 20, an appropriate height may be selected for lid 27, and lid 27 may be closed by rotating it to close against an opposite sidewall of tank 20.

Figure 14:
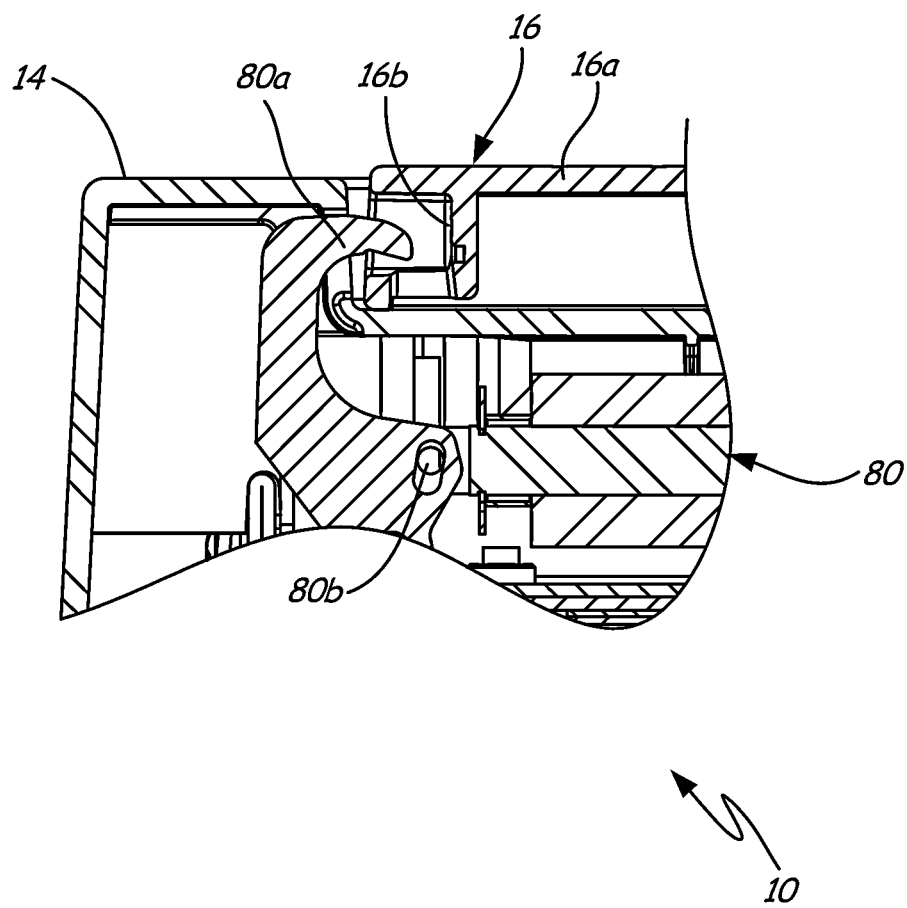
FIG. 14 is an expanded perspective view of an engagement of the lid of the support cleaning system with a latch mechanism of the support cleaning system.

FIG. 14 shows latch mechanism 80, which functions together with lid sensor 78. Lid sensor 78 and latch mechanism 80 in this embodiment are secured to mounting plate 44 (shown, for example, in FIG. 8). Lid sensor 78 is a sensor (e.g., a magnetic sensor) configured to detect when lid 16 (shown in FIG. 1) is closed against top housing 14 (shown in FIG. 1). Latch mechanism 80 is a locking mechanism configured to lock lid 16 in the closed orientation during operation. As discussed below, lid sensor 78 and latch mechanism 80 are desirably in signal communication with a controller of system 10 (not shown), thereby allowing the controller to operate latch mechanism 80 while lid 16 is closed during support removal operation. This prevents lid 16 from being opened during the support removal operation, thereby reducing the risk of a user coming into contact with the aqueous cleaning solution in system 10.

FIG. 14 illustrates latch mechanism 80 in a locked position with lid 16. As shown, lid 16 includes handle 16a and slot 16b, where handle 16a is a gripping handle that allows a user to grasp lid 16 for opening and closing lid 16. Slot 16b is an opening in lid 16 adjacent to handle 16a, which is configured to receive a pivoting latch 80a of latch mechanism 80 when the controller of system 10 (not shown in FIG. 14) directs lid 16 to be locked. Latch 80a pivots forward and back on a hinge 80b. When lid 16 is closed against top housing 14, lid sensor 78 detects the presence of lid 16, thereby causing latch 80a to pivot forward and engage with slot 16b during operation. In the event that lid sensor 78 does not detect the presence of lid 16 (i.e., lid 16 is not closed) at the beginning of a support removal operation, then the controller of system 10 may pause the support removal operation until lid 16 is closed. As discussed above, this prevents lid 16 from being opened during the support removal operation, thereby reducing the risk of a user coming into contact with the aqueous cleaning solution in system 10.

Figure 15:
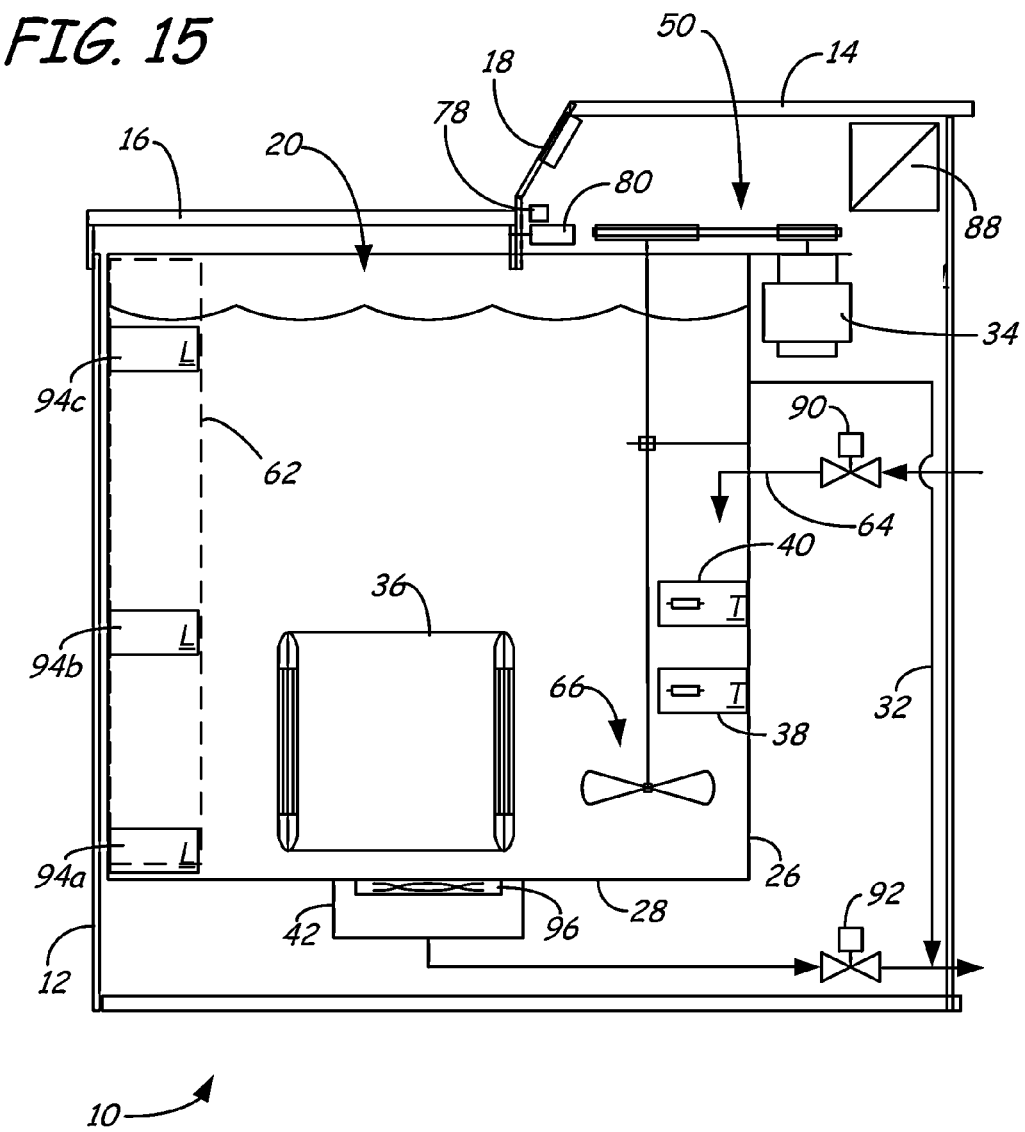
FIG. 15 is a schematic illustration of the support cleaning system, depicting the automated functionality of the support cleaning system.

FIG. 15 is a schematic illustration of system 10, depicting the automated functionality of system 10, where the separate chambers of tank 20 are omitted for ease of discussion. As shown, system 10 also includes controller 88, which is one or more processor-based units configured to operate system 10. Controller 88 is desirably in signal communication with control panel 18, drive motor 34, heating element 36, temperature sensor 38, temperature switch 40, level sensor 62, lid sensor 78, latch mechanism 80, inlet value 90, and outlet valve 92, with one or more communication lines (not shown). This arrangement allows controller 88 to monitor and direct the control of system 10 with signal commands during a support removal operation.

In the shown embodiment, before the support removal operation is started, controller 88 receives input signals from control panel 18, indicating a user selected cycle length and fill level, as described further below. At the beginning of a support removal operation, controller 88 may receive a signal from lid sensor 78 that lid 16 is closed against top housing 14. Controller 88 may then lock lid 16 to top housing 14 with latch mechanism 80, as discussed above. Controller 88 may then direct inlet valve 90 to open to fill tank 20 with the carrier medium via inlet line 64, and receive fluid level signals from level sensor 62 relating to how full tank 20 is. As shown in FIG. 15, level sensor 62 includes three detection levels, referred to as levels 94a-94c, where level 94a represents an empty or substantially empty fluid level, level 94b represents an intermediate fluid level, and level 94c represents an upper fluid level. Controller 88 may direct inlet valve 90 to close once a selected level is detected.

Level sensor 62 desirably includes multiple fluid level detection points to accommodate a range of fill levels, allowing tank 20 to accommodate different load sizes. In the shown embodiment, levels 94b and 94c are suitable for accommodating two load sizes, such as a half load (e.g., about 2 gallons) and a full load (e.g., about 4 gallons). The use of multiple load sizes is beneficial for reducing the amount of the carrier medium and support removal composition required to operate system 10. For example, a half load may be used with smaller 3D models/support structures wherein the basket lid 27 is placed in its lower position, and a full load may be used with larger 3D models/support structures wherein the basket lid 27 is placed in its upper position. In one embodiment, level 94b and/or level 94c may also function as safety sensors, where various functions of system 10 may be halted in the event that the fluid level falls below level 94b or level 94c. For example, controller 88 may shut off heating element 36 and/or halt the rotation of impeller 66 if the fluid level falls below level 94b. This reduces the risk of damage to system 10 and/or the 3D model when the fluid level is too low, such as if a leak occurs in tank 20.

When operating at a half load, the carrier medium is desirably filled to a certain point above level 94b, which may be based on a predetermined time period after level 94b is reached (e.g., about 10 seconds after level 94b is reached). Similarly, when operating at a full load, the carrier medium is desirably filled to a certain point above level 94c, which may be based on a predetermined time period after level 94c is reached (e.g., about 10 seconds after level 94c is reached).

During the fill process, the support removal composition may already be placed in tank 20. As the carrier medium is introduced into tank 20, the carrier medium may dissolve the support removal composition to form the aqueous cleaning solution. When the desired amount of the carrier medium is reached, controller 88 may close inlet value 90, and direct heating element 36 to begin heating the aqueous cleaning solution. Controller 88 may monitor signals from temperature sensor 38 to regulate the operation of heating element 36, thereby substantially maintaining a desired temperature of the aqueous cleaning solution. If a desired temperature is exceeded, controller 88 may direct temperature switch 40 to shut off heating element 36. Examples of suitable temperatures for the aqueous cleaning solution range from about 15° C. to about 90° C., with particularly suitable temperatures ranging from about 50° C. to about 85° C., and with even more particularly suitable temperatures ranging from about 70° C. to about 80° C.

When the desired temperature is reached, controller 88 may direct drive motor 34 to rotate impeller 66 to agitate the aqueous cleaning solution (via pulley assembly 50), as discussed above. When the support removal operation is completed, controller 88 may halt drive motor 34, and direct outlet value 92 to open to drain the cleaning solution from tank 20 via drain line 42.

When the fluid level in tank 20 falls below level 94a, or after a predetermined time period after the fluid level falls below 94a, controller 88 may direct outlet valve 92 to close drain line 42. As discussed below, controller 88 may then direct system 10 to perform a rinse operation in which tank 20 is refilled with the carrier medium to rinse any residual aqueous cleaning solution from the 3D model. If an error condition is detected, or in response to an input signal from control panel 18 signaling cancellation of the operation, controller 88 may automatically drain the tank by directing outlet valve 92 to open.

Figure 16:
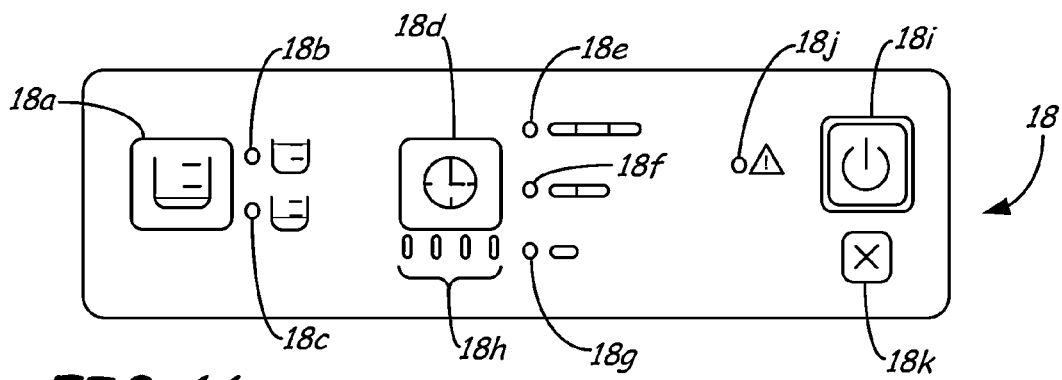
FIG. 16 is an expanded front plan view of a control panel of the support cleaning system.

FIG. 16 illustrates control panel 18, which provides a user interface for system 10. In the shown embodiment, control panel 18 is a touch screen displaying buttons and indicators 18a-18k. Button 18a is for selecting a desired fill level for tank 20, allowing selection between two preprogrammed load sizes, an intermediate or a full tank level. Indicators 18b is an LED that lights up to indicate that a full tank level has been selected, while 18c is an LED that lights up to indicate that an intermediate tank level has been selected. In other embodiments, control panel 18 may include actuators (e.g., buttons) that allow the user to select among a wider range of tank fill levels (e.g., from one gallon to five gallons), or to input a fill level. Button 18d is for selecting a desired cycle length. In the shown embodiment, three preprogrammed cycle lengths are available: long, medium, and short. Indicators 18e, 18f, and 18g are LEDs which light up to indicate selection of a cycle having a long, medium, or short duration, respectively. In alternate embodiments, control panel 18 may include also simple actuators (e.g., buttons) that allow the user to select among a different range of durations, or to input the desired cycle length.

Indicator 18h is an LED that lights up to indicate progress once a cleaning cycle is underway. In the shown embodiment, four level of progress are indicated by bars that light up as a cycle progresses from start to finish. Button 18i is a start button for starting operation of the system 10 in a cleaning cycle. Indicator 18j is an LED that lights up to indicate that an error condition has occurred. Button 18k is a cancel button for cancelling a cleaning operation of the system 10.

Figure 17:
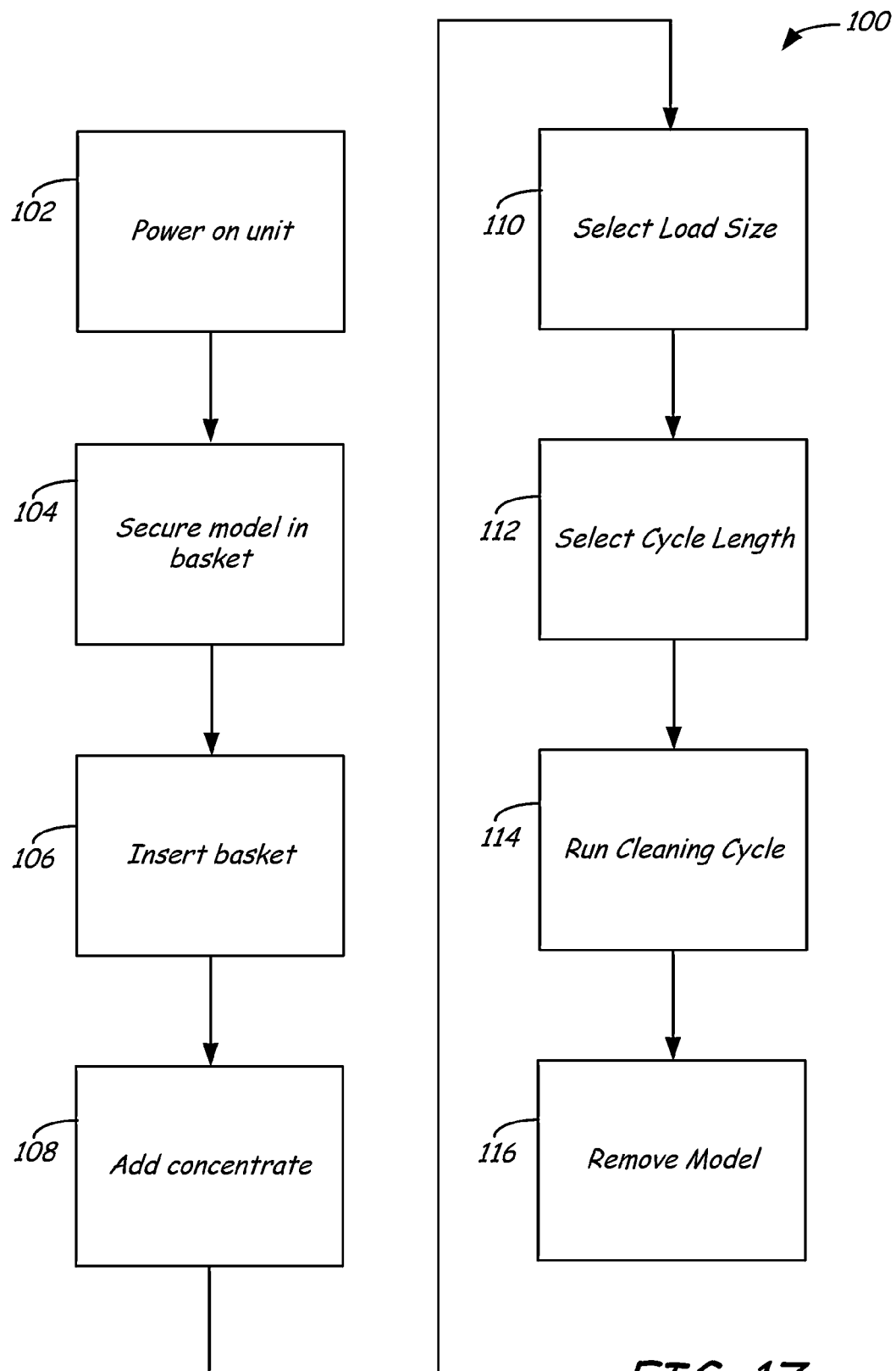
FIG. 17 is a flow diagram of a method for operating the support cleaning system.
Figure 18:
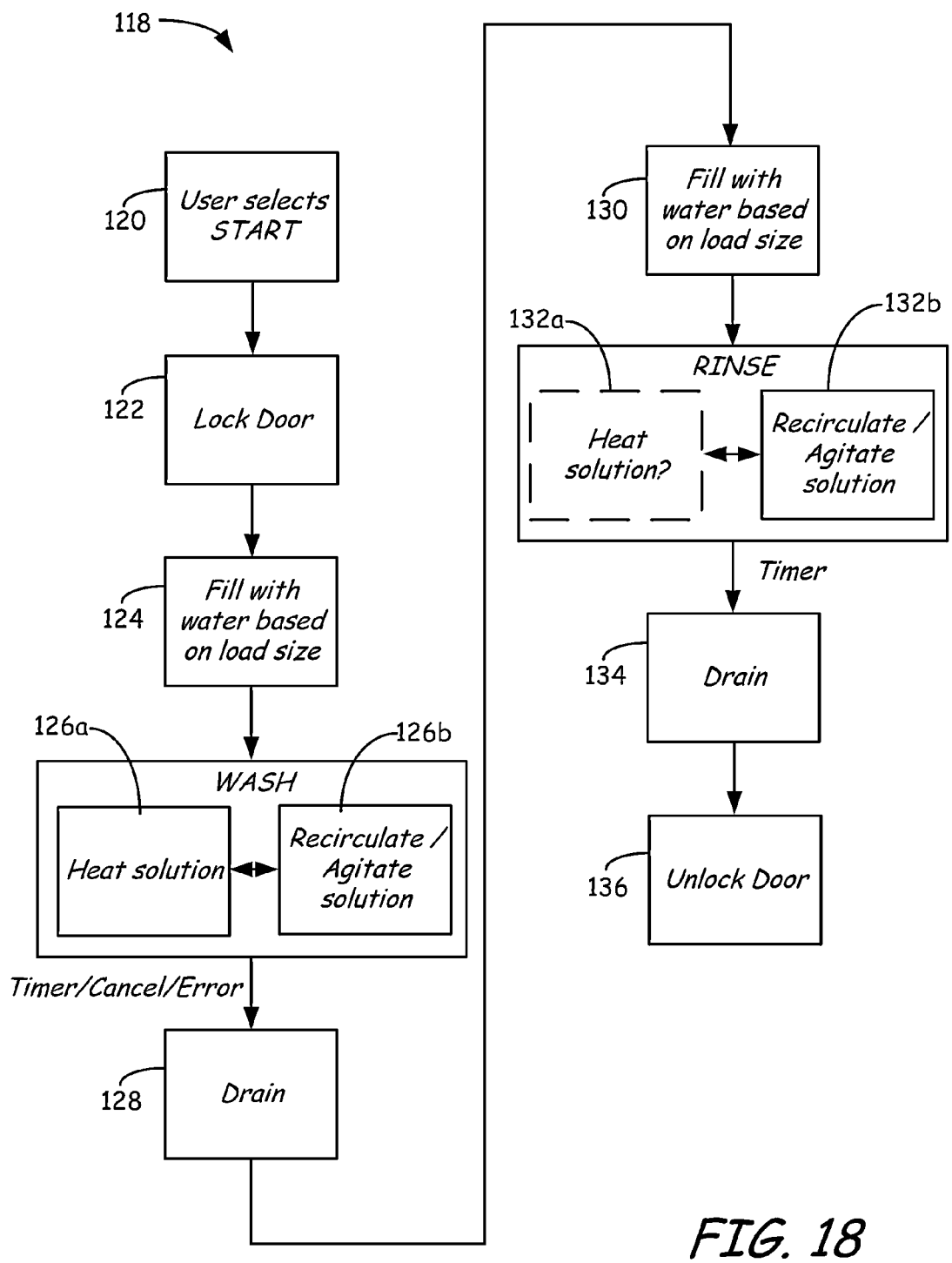
FIG. 18 is a flow diagram of a method for running a support removal operation pursuant to the method depicted in FIG. 17.

FIGS. 17 and 18 are flow diagrams of automatic methods for operating support cleaning systems of the present disclosure, such as system 10. The following discussions of the methods are made with reference to system 10 with the understanding that the methods may be performed with a variety of support cleaning systems of the present disclosure. As shown in FIG. 17, method 100 for operating system 10 includes steps 102-116, and initially involves powering up system 10 (step 102). System 10 may be connected to an external power supply via power cord receptacle 11 to receive electrical power, and/or may include a portable power supply. The 3D model/support structure may be secured in basket 23, an alternative device such as a cage or porous sack, or optionally, placed directly into tank 20 (step 104). Upon securing the 3D model in basket 23, the user may open lid 16 and insert basket 23 into reaction chamber 22 of tank 20 (step 106). In alternate embodiments wherein no basket is used, step 106 may be omitted and the 3D model placed or secured directly into the tank in step 104.

The support removal composition may then be added to cleaning agent chamber 24 (step 108). The amount of the support removal composition may vary depending on the load size of the carrier medium in tank 20 and the desired concentration of the resulting aqueous cleaning solution. Examples of suitable amounts of the support removal composition in two gallons the carrier medium (e.g., water) range from about 60 grams (about 2 ounces) to about 570 grams (about 20 ounces), with particularly suitable amounts ranging from about 110 grams (about 4 ounces) to about 280 grams (about 10 ounces), and with even more particularly suitable amounts ranging from about 130 grams (about 4.5 ounces) to about 200 grams (about 7 ounces). These amounts may be doubled for a full-sized load (e.g., a four gallon load). In alternate embodiments wherein the support structure is dissolvable in the carrier medium and needs no additional cleaning agent, step 108 may be omitted. In such embodiments, a two compartment tank may be preferred.

The user may then close lid 16, where lid sensor 78 then detects the presence of lid 16 in the closed orientation and may relay a corresponding signal to controller 88. The user may also select the desired load size with button 18a of control panel 18 (step 110), and may select the cycle length with button 18d of control panel 18 (step 112). As discussed above, the load sizes may be varied to accommodate 3D models/support structures of different sizes and volumes. The cycle lengths may also be varied to accommodate 3D models/support structures of different sizes and volumes. In alternative embodiments, steps 104-112 of method 100 may be performed in different orders based on user preference.

Pursuant to step 114 of method 100, system 10 may then perform the support removal operation to remove or substantially remove the support structure from the 3D model, as discussed below. During the support removal operation, controller 88 may signal control panel 18 to indicate the cycle progress by sequentially lighting the bars of indicator 18h. After the support removal operation is completed, controller 88 may unlock lid 16, and provide a visible and/or audible indicator to notify the user that the support removal operation is complete. The user may then open lid 16 and remove the 3D model, which is now free or substantially free of the support structure (step 116).

As shown in FIG. 18, method 118 is an exemplary method for performing a support removal operation with system 10, pursuant to step 114 of method 100 (shown in FIG. 17). As shown in FIG. 18, method 118 includes steps 120-136, and initially involves starting the support removal operation (step 120). For example, the user may actuate start button 18i on control panel 18 to start the support removal operation. Controller 88 may then direct latch mechanism 80 to lock lid 16 to top housing 14 (step 122), assuming that lid sensor 78 detects the presence of lid 16 in the closed orientation. If not, controller 88 may provide a visual and/or audible indicator to the user on control panel 18 (e.g., indicator 18j) to notify the user that lid 16 needs to be closed before the support removal operation may proceed.

Once lid 16 is locked, controller 88 may direct inlet value 90 to open to fill tank 20 to the selected load size with the carrier medium (step 124). As discussed above, the carrier medium may mix and at least partially dissolve the support removal composition to form the aqueous cleaning solution. When the fluid level corresponding to the load size is reached, controller 88 may direct inlet value 90 to close.

Controller 88 may then direct heating element 36 to begin heating the aqueous cleaning solution until a desired temperature is reached (step 126a), and may direct drive motor 34 to rotate impeller 66 to agitate the aqueous cleaning solution in tank 20, as discussed above (step 126b). During the agitation, heating element 36 may continue to heat the aqueous cleaning solution in a continuous and/or intermittent manner to substantially maintain the desired solution temperature. The support removal operation may continue until the cycle length from step 110 of method 100 expires. Alternatively, controller 88 may halt the support removal operation if it detects an error (e.g., if the fluid level falls below level 94b). Additionally, the user may cancel the support removal operation at any point by actuating cancel button 18k on control panel 18. In each of these events, including the cancellation event, system 10 desirably performs steps 128-136 to rinse the 3D model before the user may come in to contact with the 3D model. This reduces the risk of the user contacting the cleaning solution. In alternative embodiments, typically where the cleaning solution is non-hazardous or is not used, system 10 may only perform a drain operation pursuant to step 128, and omit the rinsing operation of steps 130-134, if an error is detected.

Accordingly, after the support removal operation is complete (e.g., cycle length expires, error detected, and/or canceled), controller 88 may direct outlet valve 92 to open to drain the aqueous cleaning solution from tank 20 (step 128). When the fluid level falls below level 94a, controller 88 may direct outlet valve to close, and direct inlet valve 90 to open again to refill tank 20 with the carrier medium to the selected load size for rinsing the 3D model (step 130). Controller 88 may then direct heating element 36 to begin heating the rinsing carrier medium until a desired temperature is reached (step 132a), and may direct drive motor 34 to rotate impeller 66 to agitate the rinsing carrier medium in tank 20, as discussed above (step 132b). In an alternative embodiment, the heating process of step 132a may be omitted.

The rinsing process may also be performed based on a predetermined cycle length, which may be the same or different from the cycle length selected in step 110 of method 100. After the rinsing operation is complete, controller 88 may direct outlet valve 92 to open to drain the rinsing carrier medium from tank 20 (step 134). When the fluid level falls below level 94a, controller 88 may direct outlet valve to close, and may unlock lid 16 (step 136). The user may then open lid 16 and remove the 3D model, which is now free or substantially free of the support structure.

As discussed above, the support cleaning system of the present disclosure (e.g., system 10) is an environmentally friendly, self-contained system that is easy to operate and provides increased safety features. This allows users to remove soluble support structures from 3D models with minimal intervention and skilled required. Support removal using system 10 may be safely performed by an operator wearing no personal protective equipment (PPE). Additionally, the multiple-chamber arrangement in tank 20 provides good velocity flow profiles of the aqueous cleaning solution, particularly with the embodiment that includes impeller 66, barriers 68a and 68b, and impeller housing 48. This correspondingly reduces the time required to dissolve and remove the support structure from the 3D model.

System 10 may be used with a variety of different support removal compositions, or, as mentioned above, the support removal composition may be entirely omitted in the use of system 10. In some embodiments, the support removal composition includes one or more oxidizing agents, one or more chelating agents, and one or more pH modifiers, where the concentration of the oxidizing agent(s) in the composition is desirably high enough to assist in the removal of soluble support structures from 3D models. Additionally, the concentration of the pH modifier(s) in the composition is desirably suitable such that the composition is configured to create an aqueous solution in water having a pH ranging from about 7 to about 10. As discussed below, the support removal composition is environmentally and user friendly, and is suitable for use with an aqueous carrier medium in a support removal tank to remove soluble support structures from 3D models.

As discussed above, the support removal composition includes one or more oxidizing agents, one or more chelating agents, and one or more pH modifiers. The one or more oxidizing agents include one or more hydrate-based compounds (i.e., compounds containing water molecules) and/or one or more perhydrate-based compounds (i.e., where the water molecule(s) are substituted with hydrogen peroxide).

Examples of suitable hydrate-based oxidizing agents for use in the support removal composition include sodium perborates, such as sodium perborate monohydrate, sodium perborate trihydrate, sodium perborate tetrahydrate, and combinations thereof. When dissolved in an aqueous carrier medium (e.g., water) to form an aqueous solution, the sodium perborate may produce hydrogen peroxide and borate.

An example of a suitable perhydrate-based oxidizing agents for use in the support removal composition includes sodium percarbonate, which is a crystalline adduct of sodium carbonate and hydrogen peroxide, having the formula $Na_2CO_3 \cdot 1.5H_2O_2$. When dissolved in an aqueous carrier medium (e.g., water) to form an aqueous solution, the sodium percarbonate may produce hydrogen peroxide and sodium carbonate, as illustrated in the following reaction:

$$2(Na_2CO_3 \cdot 1.5H_2O_2) \rightarrow 2Na_2CO_3 + 3H_2O_2$$

In particular, it is believed that the primary copolymer in the soluble support material (e.g., the carboxyl groups of the primary copolymer) react with the hydrogen peroxide of the hydrate-based and the perhydrate-based oxidizing agents and neutralize, thereby rendering the support structure soluble to dissolve and/or disperse into the aqueous solution. Accordingly, examples of suitable concentrations of oxidizing agents in the composition include at least about 35% by weight, with particularly suitable concentrations ranging from about 40% by weight to about 70% by weight, and with even more particularly suitable concentrations ranging from about 40% by weight to about 60% by weight, based on an entire weight of the composition. As used herein, the term "entire weight of the composition" refers to a weight that does not include any carrier medium, such as water and/or solvents, but includes components in solid and liquid states (e.g., solid and liquid surfactants).

In some embodiments, the support removal composition is provided as substantially solid particles. Since the oxidizing agents are suitable sources of hydrogen peroxide in a substantially solid state, in these embodiments, at least about 75% by weight of the hydrogen peroxide in the support removal composition is desirably provided by the oxidizing agents, more desirably at least about 85%, and even more desirably at least about 95%, based on an entire weight of the hydrogen peroxide in the composition. In one embodiment, the oxidizing agent(s) may be provided as coated particles, such as coated sodium percarbonate particles.

As discussed above, the support removal composition also desirably includes one or more chelating agents to assist in the support removal process by managing and controlling metal ions in the aqueous solution. Examples of suitable chelating agents for use in the composition include organic acid and/or acetate chelating agents, such as glutamic acids, acetates thereof, iminodisuccinic acid and salts thereof (e.g., sodium iminodisuccinate), and combinations thereof. Examples of suitable concentrations of chelating agents in the composition include at least about 10% by weight, with particularly suitable concentrations ranging from about 12% by weight to about 40% by weight, and with even more particularly suitable concentrations ranging from about 15% by weight to about 30% by weight, based on the entire weight of the composition.

The support removal composition also desirably includes one or more pH modifiers configured to lower the pH of the aqueous solution. Examples of suitable pH-lowering modifiers include citric acids, acetic acids (e.g., ethylenedinitrilotetraacetic acid, diethylenetriaminepentaacetic acid, and nitrilotriacetic acid), acetates thereof, and combinations thereof. Examples of suitable concentrations of pH modifiers in the composition include at least about 5% by weight, with particularly suitable concentrations ranging from about 10% by weight to about 30% by weight, and with even more particularly suitable concentrations ranging from about 12% by weight to about 20% by weight, based on the entire weight of the composition. In some embodiments, the concentration of the pH modifier(s) in the composition desirably allow the support removal composition to form the aqueous solution having a pH ranging from about 7 to about 10.

In some embodiments, the support removal composition also includes one or more surfactants to lower the surface tension of the aqueous carrier medium. This may increase the rate at which the components of the support removal composition dissolve in the aqueous carrier medium (e.g., water). Examples of suitable surfactants for use in the composition include anionic and non-ionic surfactants, such as alcohol ethoxylates, alcohol propoxylates, alkylphenol ethoxylates, alkyl sulfates, alkyl sulfonates, sulfosuccinates, and combinations thereof.

Examples of particularly suitable surfactants include alcohol ethoxylates, such as products of aliphatic $C_3$-$C_{20}$ primary or secondary alcohols with ethylene oxide, products of $C_8$-$C_{18}$ alkyl-phenols and ethylene oxide, and combinations thereof. For example, the alcohol ethoxylates may be derived from $C_8$-$C_{18}$ alcohols with average molar concentrations of ethylene oxide ranging from about two moles to about nine moles. Suitable commercially available alcohol ethoxylates for use in the removal composition include those under the trade designation "TOMADOL" from Tomah Products, Inc., Milton, Wis.; owned by Air Products and Chemicals, Inc., Allentown, Pa.

Examples of suitable concentrations of surfactants in the composition range from about 0.1% by weight to about 15% by weight, and with particularly suitable concentrations ranging from about 0.5% by weight to about 10% by weight, and with even more particularly suitable concentrations ranging from about 1% by weight to about 7% by weight, based on the entire weight of the composition.

In addition to the oxidizing agent(s), the chelating agent(s), the pH modifier(s), and, optionally, the surfactant(s), the composition of the present disclosure may also include one or more additional materials. Examples of suitable additional materials for use in the composition include fillers, sodium bicarbonate ($NaHCO_3$), sodium carbonate ($Na_2CO_3$), colorants, odorants, and combinations thereof.

For example, sodium bicarbonate and/or sodium carbonate may be included in the support removal composition to assist sodium percarbonate. Examples of suitable concentrations of sodium bicarbonate in the composition range from about 1% by weight to about 20% by weight, and with particularly suitable concentrations ranging from about 5% by weight to about 15% by weight, based on the entire weight of the composition. Examples of suitable concentrations of sodium carbonate in the composition range from about 10% by weight to about 30% by weight, and with particularly suitable concentrations ranging from about 15% by weight to about 25% by weight, based on the entire weight of the composition.

Fillers may be used for a variety of purposes, such as suspension stability in the aqueous solution. Examples of suitable fillers for use in the support removal composition include silicon dioxide, silica quartz, calcium carbonates, calcium silicates, aluminum oxide, aluminum silicates, and combinations thereof. Examples of suitable commercially available fillers include silicon dioxides under the trade designation "AEROSIL" Fumed Silicas from Degussa GmbH, Frankfurt, Germany; and under the trade designation "SIPERNAT" Precipitated Silicas from Evonik Degussa GmbH, Frankfurt, Germany.

In embodiments in which the fillers provide suspension stability, the fillers desirably exhibit low average particle sizes. Examples of suitable concentrations of fillers in the composition range from about 0.1% by weight to about 10% by weight, and with particularly suitable concentrations ranging from about 1% by weight to about 5% by weight, based on the entire weight of the composition.

Examples of suitable colorants for use in the support removal composition include pigments, dyes, and the like, such as iron oxides, lead oxides, zinc oxides, strontium chromate, copper chromium, carbon black, coal dust, titanium dioxide, lead silicate, barium sulfate, and combinations thereof. Suitable concentrations of the colorants in the composition range from about 0.1% by weight to about 10% by weight, with particularly suitable concentrations ranging from about 1% by weight to about 5% by weight, based on the entire weight of the composition.

The support removal composition may be formed using a variety of mixing techniques. In one embodiment, the support removal composition may be formed by initially combining the oxidizing agent(s), the chelating agent(s), the pH modifier(s), and any additional additives in a vessel, and mixing the components at 25° C. until substantially blended. In embodiments in which the surfactant(s) are provided as solids, the surfactant(s) may also be blended in this step. Alternatively, in embodiments in which the surfactant(s) are provided as liquids and/or in flowable states, the surfactant(s) may be sprayed onto the blended components, desirably during the same and/or during an additional mixing step. The spray process is beneficial for increasing the particle densities of the blended components and may allow the surfactant(s) to form wetting coatings over the solid components. The mixing step may continue until all of the components are substantially blended.

Figure 19:
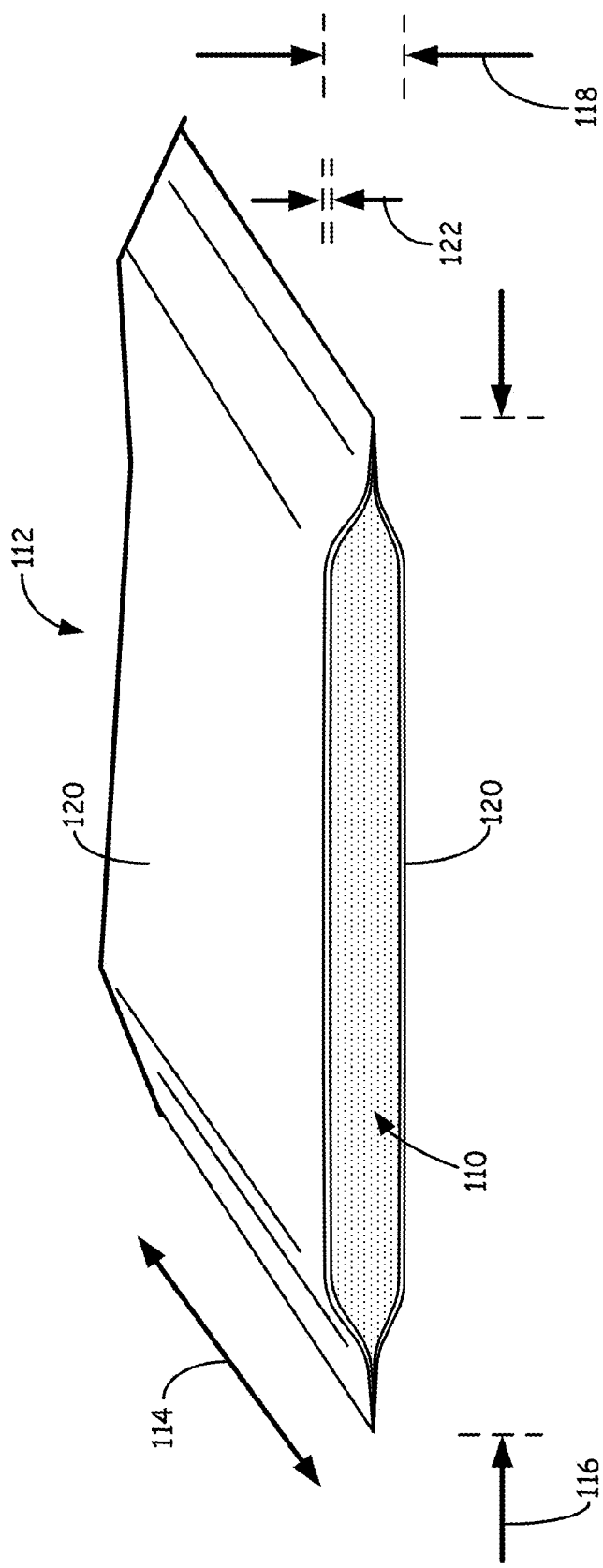
FIG. 19 is a cut-away perspective view of a portion of a water-soluble sachet containing a support removal composition.

As shown in FIG. 19, in one embodiment, the support removal composition may be supplied in a water-soluble sachet or other packaging, such as composition 110 retained in an interior cavity of sachet 112. This is beneficial for reducing the risk of skin contact with composition 110 during handling. Sachet 112 may be fabricated from a variety of water-soluble materials, such as polyvinyl alcohols, polyester amides, polyethylene oxides, methacrylate-vinyl alcohol copolymers, and combinations thereof. Sachet 112 may also include one or more additional additives, such as plasticizers, surfactants, colorants, odorants, stabilizers, and combinations thereof. Examples of concentrations of these additional additives in the material sachet 112 range from about 0.1% by weight to about 10% by weight, with particularly suitable concentrations ranging from about 0.5% by weight to about 5% by weight, based on the entire weight of the material of sachet 112. Examples of suitable polyvinyl alcohol materials for sachet 112 include those commercially available under the trade designation "MONOSOL M8630" films from Monosol, LLC, Portage, Ind.

The dimensions of sachet 112 may vary based on the desired concentrations of the aqueous solution and the volume of the aqueous carrier medium to be used. For example, as shown in the FIG. 19, sachet 112 may have a rectangular geometry with length 114 ranging from about 7.6 centimeters (about 3 inches) to about 115 centimeters (about 6 inches), width 116 ranging from about 2.5 centimeters (about 1 inch) to about 10.2 centimeters (about 4 inches), and filled thickness 118 up to about 5 centimeters (about 2 inches). In one embodiment, suitable dimensions for sachet 112 include length 114 of about 12.7 centimeters (about 5 inches) or less, width 116 of about 6.4 centimeters (about 2.5 inches) or less, and filled thickness 118 of about 2.5 centimeters (about 1 inch) or less, with particularly suitable dimensions including length 114 of about 10.2 centimeters (about 4 inches) or less, width 116 of about 5.7 centimeters (about 2.25 inches) or less, and filled thickness 118 of about 1.9 centimeters (about 0.75 inches) or less.

The walls of sachet 112 (referred to as walls 120) are desirably thin to reduce the dissolution time in water, while also being thick enough to resist fracturing during handling, transportation, and storage. Suitable average film thicknesses for walls 120 (referred to as film thicknesses 122) range from about 125 micrometers (about 1 mil) to about 130 micrometers (about 5 mils), with particularly suitable film thicknesses 122 ranging from about 38 micrometers (about 1.5 mils) to about 76 micrometers (about 3 mils).

Walls 120 may also be rendered porous (e.g., microporous) to increase the dissolution rate of the packages in water and/or to allow gas escape for easier secondary packaging. The porosity may be formed using a variety of techniques, such as water atomization and/or manual perforation techniques. In this embodiment, the pores of walls 120 are desirably smaller than the particle sizes of composition 110 to prevent composition 110 from leaking out of sachet 112 during handling, transportation, and storage.

The amount of composition 110 retained in sachet 112 may also vary based on the desired concentrations of the aqueous solution. For the above-discussed dimensions, suitable amounts of composition 110 to be filled and retained in sachet 112 range from about 60 grams (about 2 ounces) to about 570 grams (about 20 ounces), with particularly suitable amounts ranging from about 110 grams (about 4 ounces) to about 280 grams (about 10 ounces). In embodiments in which sachet 112 has the above-discussed particularly suitable dimensions, suitable amounts of composition 110 to be filled in sachet 112 range from about 140 grams (about 5 ounces) to about 230 grams (about 8 ounces).

After being filled, sachet 112 is desirably sealed (e.g., thermally and/or water sealed) to prevent water from contacting composition 110 from the seal locations, and to prevent composition 110 from leaking out of sachet 112 during handling, transportation, and storage. The seams illustrated for sachet 112 in FIG. 19 are examples of suitable seams. However, the geometry of sachet 112, including the seams of sachet 112, may vary based on a variety of aesthetic and functional designs. Additionally, sachet 112 may also be sealed in external, water-sealable packages for handling, transportation, and storage. The external packages may be derived from a variety of materials, such as metallic foils, multi-layer films, and the like. The external packages may also include tear-open notches to provide easy access to sachet 112, and may also include one or more one-way degassing valves.

Figure 20:
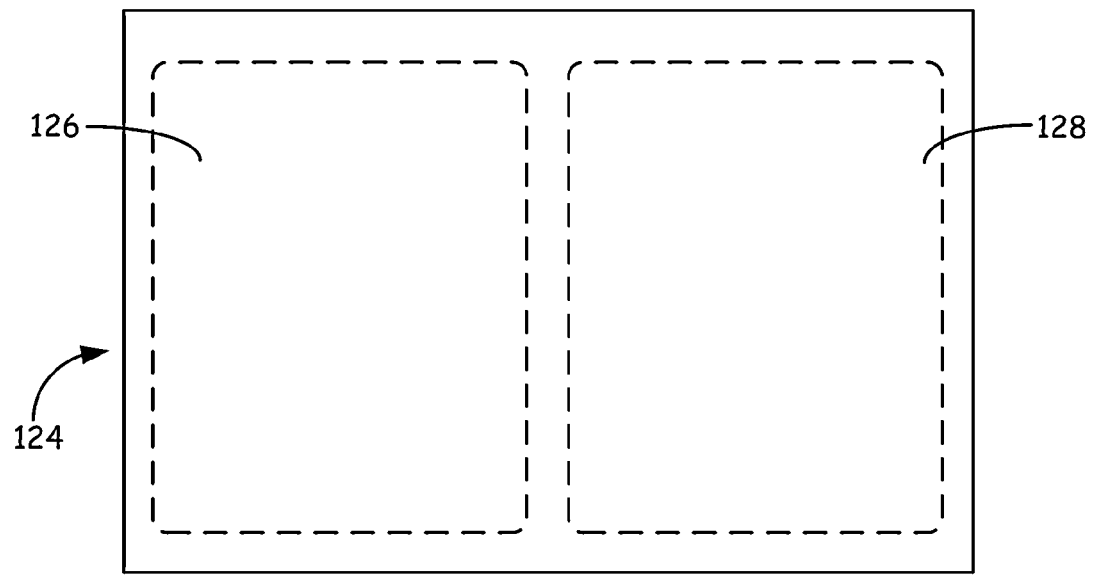
FIG. 20 is an illustration of a package for containing a support removal composition having a two-component system.

In an alternative embodiment, the support removal composition may be provided as a two-component system. As shown in FIG. 20, package 124 may be used to retain and separate the two components of the support removal composition, where a first component may be retained in pocket 126 and the second component may be retained in pocket 128. Package 124 may also include a mechanism for opening pockets 126 and 128, such as a perforated line of separation or separation slit (not shown).

In this embodiment, the oxidizing agent(s) and any compatible additives (e.g., sodium bicarbonate and sodium carbonate) may be blended as the first component of the support removal composition, and the chelating agent(s) and pH modifier(s) may be blended as the second component of the support removal composition. Suitable concentrations for each of the materials in the blends of the first and second components include those discussed above, where the concentration ranges are based on an entire weight of the two-component system with the first and second components mixed together. The first and second components may each also be retained in separate water-soluble sachets, such as sachet 112 (shown in FIG. 19), where the separate water-soluble sachets maybe retained in pockets 126 and 128, respectively. This two-component system may increase the stability of the support removal composition during transportation and storage.

Figure 21:
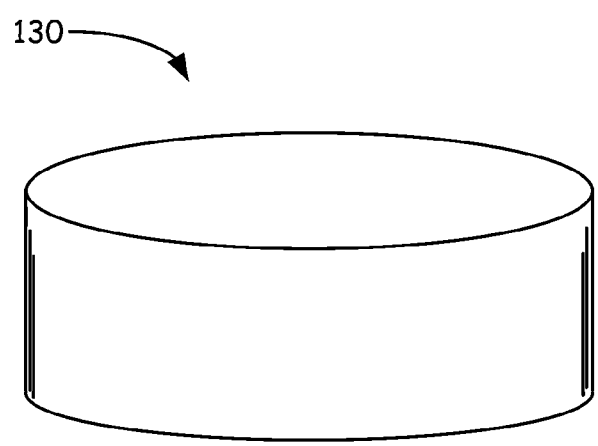
FIG. 21 is a perspective view of a puck-shaped capsule of a single-dose, support removal composition.

In a further alternative embodiment, a particularly suitable support removal composition includes one or more oxidizing agents (e.g., sodium percarbonate), sodium bicarbonate and/or sodium carbonate, and one or more environmentally-friendly chelating agents, such as iminodisuccinic acid and salts thereof (e.g., sodium iminodisuccinate). In this embodiment, in which an iminodisuccinic acid/salt thereof is used instead of glutamate-based chelating agent, the support removal composition may be compounded together as a single-dose tablet, pellet (e.g., pellet 29), capsule, or the like, while maintaining compositional stability during transportation and storage. For example, as shown in FIG. 21, the support removal composition under this embodiment may be compounded as capsule 130, which is a puck-shaped capsule. In some embodiments, the support removal composition may also be encased in a sachet, such as sachet 112 (shown in FIG. 19).

In this embodiment, the support removal composition may include lower concentrations of the oxidizing agent(s) (e.g., sodium percarbonate), which are generally made up for with higher concentrations of sodium bicarbonate and/or sodium carbonate. Accordingly, examples of suitable concentrations of oxidizing agents in the composition of this embodiment (e.g., for capsule 130) range from about 5% by weight to about 20% by weight, with particularly suitable concentrations ranging from about 5% by weight to about 15% by weight, based on an entire weight of the composition.

Examples of suitable concentrations of sodium bicarbonate in the composition of this embodiment (e.g., for capsule 130) range from about 40% by weight to about 60% by weight, with particularly suitable concentrations ranging from about 45% by weight to about 55% by weight, based on an entire weight of the composition. Examples of suitable concentrations of sodium carbonate in the composition of this embodiment (e.g., for capsule 130) range from about 10% by weight to about 30% by weight, with particularly suitable concentrations ranging from about 15% by weight to about 25% by weight, based on an entire weight of the composition. Examples of suitable concentrations of iminodisuccinic acid and salts thereof (e.g., sodium iminodisuccinate) in the composition of this embodiment (e.g., for capsule 130) range from about 15% by weight to about 30% by weight, with particularly suitable concentrations ranging from about 15% by weight to about 25% by weight, based on an entire weight of the composition.

During use for removing soluble support structures from 3D models, a single sachet 112, the components of a single package 124, or a single capsule 130 may be dissolved in an aqueous carrier medium to form the aqueous solution. Suitable volumes of the aqueous carrier medium for use with a single sachet 112 range from about 3.8 liters (about 1 gallon) to about 19 liters (about 5 gallons), with particularly suitable volumes ranging from about 7.6 liters (about 2 gallons) to about 11.4 liters (about 3 gallons). As discussed above, the pH modifier(s) desirably balance the pH of the resulting aqueous solution, such that the aqueous solution desirably has a pH ranging from about 7 to about 10. The 3D model/support structure may then be immersed in, sprayed with, or otherwise come in contact with the aqueous solution to remove the support structure from the 3D model.

The aqueous solution may also be maintained at one or more elevated temperatures to assist in the removal of the support structure. Suitable temperatures for the aqueous solution range from about 25° C. to about 80° C. The support removal solution may also be agitated and/or subjected to ultrasonic frequencies.

As discussed above, while not wishing to be bound by theory, it is believed that the primary copolymer in the support material react with the hydrogen peroxide of the perhydrate(s) and neutralize, thereby rendering the support structure soluble to dissolve and/or disperse into the aqueous solution. Thus, the support structure is desirably dissolved away from the 3D model until at least a portion of the support structure is removed, and more desirably until substantially all of the support structure is removed. The resulting removed support structure particles exhibit small particle sizes, which may be collected with a drainage filter while allowing the aqueous solution to be readily drained.

Furthermore, the support removal composition of the present disclosure and the water-soluble packing (e.g., composition 110 and sachet 112) may incorporate environmentally friendly materials, thereby allowing the aqueous solution to be discarded in a convenient manner after the support removal process is completed. This reduces costs and concerns that may otherwise be associated with hazardous and non-environmentally-friendly materials.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques. The following compositional abbreviations are used in the following Examples:

"Sodium percarbonate": A perhydrate-based oxidizing agent having the having the formula $Na_2CO_3 \cdot 1.5H_2O_2$, with a bulk density ranging from 0.9 grams/cubic-centimeter to 1.15 grams/cubic-centimeter, and an available oxygen content greater than about 13%;

"Glutamate mixture": A mixture containing 72-76% by weight of tetrasodium N,N-bis(carboxylatomethyl)-L-glutamate chelating agent, 0.5-1.9% by weight sodium hydroxide, and the balance water, which is commercially available under the trade designation "DISSOLVINE" GL-pd-s Chelating Agent from Akzo Nobel Functional Chemicals LLC, Chicago, Ill.;

"Citric acid": Citric acid pH-modifier having greater than 99% purity;

"Surfactant": A flowable non-ionic alcohol ethoxylate surfactant commercially available under the trade designation "TORMADOL" 900 surfactant from Tomah Products, Inc., Milton, Wis.; owned by Air Products and Chemicals, Inc., Allentown, Pa.;

"Sodium bicarbonate": USP grade sodium bicarbonate powder having greater than 99% purity;

"Sodium carbonate": Sodium carbonate powder having greater than 99% purity;

"Silica filler": Precipitated silica commercially available under the trade designation "SIPERNAT" 50 Precipitated Silicas from Evonik Degussa GmbH, Frankfurt, Germany;

"Polyvinyl alcohol film": A polyvinyl alcohol film commercially available under the trade designation "MONOSOL M8630" films from Monosol, LLC, Portage, Ind.; and "Sodium iminodisuccinate": A chelating agent, which is commercially available under the trade designation "BAYPURE CX-100" sodium iminodisuccinate from Bayer Chemicals AG, Leverkusen, Germany.

Example 1: Bench-Volume Composition

A bench-volume composition of Example 1 was prepared and tested for effectiveness in removing support structures from 3D models built with fused deposition modeling systems developed by Stratasys, Inc., Eden Prairie, Minn. The composition of Example 1 was prepared by charging the sodium percarbonate, the glutamate mixture, the citric acid, the sodium bicarbonate, and the silica filler to a container, and mixing the components until well blended. The surfactant was then sprayed on the blended components during an additional mixing step over a 10-minute period. After the spraying was completed, the mixing continued for an additional five minutes to provide the resulting composition of Example 1. Table 1 lists the amounts of each component added, and the relative material concentrations in weight percent, for the composition of Example 1.

TABLE 1

| Material | Grams | Percent by Weight |
|---|---|---|
| Sodium percarbonate | 76 | 49.7 |
| Glutamate mixture | 30 | 19.6 |
| Citric acid | 20 | 13.1 |
| Surfactant | 7 | 4.6 |
| Sodium bicarbonate | 15 | 9.8 |
| Silica filler | 5 | 3.3 |

The composition of Example 1 was then filled into sachets formed from polyvinyl alcohol with walls having film thicknesses of about 51 micrometers (about 2 mils), and rendered microporous through a water atomization process. Each filled sachet weighed about 170 grams (about 6 ounces), and was dissolved in 9.5 liters (2.5 gallons) of water to form an aqueous solution. A 3D model/support structure combination was then immersed in the aqueous solution, and the aqueous solution was agitated to perform the support removal process. The 3D model was built from an acrylonitrile butadiene styrene (ABS) copolymer, and the support structure was built from a soluble support material commercially available under the trade designation "SR-30" Soluble Supports, each from Stratasys, Inc., Eden Prairie, Minn. The support removal solution containing the composition of Example 1 successfully dissolved and removed the support structure from the 3D model without visually affecting the ABS material of the 3D model.

Example 2: Production-Run Composition

A production-run composition of Example 2 was prepared and tested for effectiveness in removing support structures from 3D models built with fused deposition modeling systems developed by Stratasys, Inc., Eden Prairie, Minn. The composition of Example 2 was prepared using the same process as discussed above for Example 1. Table 2 lists the amounts of each component added, and the relative material concentrations in weight percent, for the composition of Example 2.

TABLE 2

| Material | Kilograms | Percent by Weight |
|---|---|---|
| Sodium percarbonate | 402 | 49.7 |
| Glutamate mixture | 159 | 19.6 |
| Citric acid | 106 | 13.1 |
| Surfactant | 37 | 4.6 |
| Sodium bicarbonate | 79 | 9.8 |
| Silica filler | 26 | 3.3 |

The composition of Example 2 was then filled into sachets using the same process as discussed above for Example 1, and each sachet was dissolved in 9.5 liters (2.5 gallons) of water to form an aqueous solution following the same process discussed above for Example 1. In this case, the support removal solution containing the composition of Example 2 also successfully dissolved and removed the support structure from the 3D model without visually affecting the ABS material of the 3D model.

The results of Examples 1 and 2 illustrate the effectiveness of the support removal composition of the present disclosure for removing soluble support structures from 3D models built with digital manufacturing systems. Furthermore a comparison of Examples 1 and 2 show that upscaling the composition from a bench-sized batch to a production-sized batch did not negatively affect the effectiveness of the support removal composition. Additionally, the aqueous solutions left over from the support removal processes were readily disposable without requiring treatment steps to render the solutions environmentally safe. As such, the support removal composition may be discarded (or recycled) in a convenient manner after the support removal process is completed, and did not require personal protective equipment for user operation.

Example 3: Two-Component Composition

A two-component system of Example 3 was prepared and tested for effectiveness in removing support structures from 3D models built with fused deposition modeling systems developed by Stratasys, Inc., Eden Prairie, Minn. The two-component system of Example 3 was prepared by blending the sodium percarbonate, sodium carbonate, and sodium bicarbonate to provide Component A, and blending the glutamate mixture and the citric acid to provide Component B. The blends of Components A and B were then introduced into separate sachets derived from the polyvinyl alcohol film.

Table 3 lists the amounts of each material added, and the relative material concentrations in weight percent, for the materials of Component A.

TABLE 3

| Component A | | |
|---|---|---|
| Material | Grams | Percent by Weight |
| Sodium percarbonate | 76.0 | 60.3 |
| Sodium carbonate | 35.0 | 27.8 |
| Sodium bicarbonate | 15.0 | 11.9 |

Table 4 lists the amounts of each material added, and the relative material concentrations in weight percent, for the materials of Component B.

TABLE 4

| Component B | | |
|---|---|---|
| Material | Grams | Percent by Weight |
| Glutamate mixture | 30.0 | 51.7 |
| Citric acid | 28.0 | 48.3 |

Table 5 lists the combined amounts of each material, and the relative material concentrations in weight percent, for the blend of Components A and B, along with the polyvinyl alcohol film.

TABLE 5

| Mixed Composition | | |
|---|---|---|
| Material | Grams | Percent by Weight |
| Sodium percarbonate | 76.0 | 41.3 |
| Sodium carbonate | 35.0 | 19.0 |
| Sodium bicarbonate | 15.0 | 8.1 |
| Glutamate mixture | 30.0 | 16.3 |
| Citric acid | 28.0 | 15.2 |
| Polyvinyl alcohol film | 0.1 | 0.1 |

The sachets of Components A and B were then dissolved together in 7.6 liters (2.0 gallons) of water, using a support cleaning system corresponding to system 10, to form an aqueous solution following the same process discussed above for Example 1. In this case, the support removal solution containing the composition of Example 3 also successfully dissolved and removed the support structure from the 3D model without visually affecting the ABS material of the 3D model.

Example 4: Sodium Iminodisuccinate-Based Composition

A composition of Example 4 was prepared and tested for effectiveness in removing support structures from 3D models built with fused deposition modeling systems developed by Stratasys, Inc., Eden Prairie, Minn. The composition of Example 4 was prepared by compounding sodium percarbonate, sodium bicarbonate, sodium carbonate, and sodium iminodisuccinate to provide a puck-shaped capsule corresponding to capsule 130 (shown in FIG. 25). Table 6 lists the amounts of each component added, and the relative material concentrations in weight percent, for the composition of Example 4.

TABLE 6

| Material | Grams | Percent by Weight |
|---|---|---|
| Sodium percarbonate | 16 | 9.4 |
| Sodium bicarbonate | 84 | 49.4 |
| Sodium carbonate | 33 | 19.4 |
| Sodium iminodisuccinate | 37 | 21.8 |

The capsule maintained good structural integrity during storage and casual handling. The capsule was then dissolved in 7.6 liters (2.0 gallons) of water, using a support cleaning system corresponding to system 10, to form an aqueous solution following the same process discussed above for Example 1. In this case, the support removal solution containing the composition of Example 4 also successfully dissolved and removed the support structure from the 3D model without visually affecting the ABS material of the 3D model.

Example 5: Velocity Flow Profiles

Figure 23A:
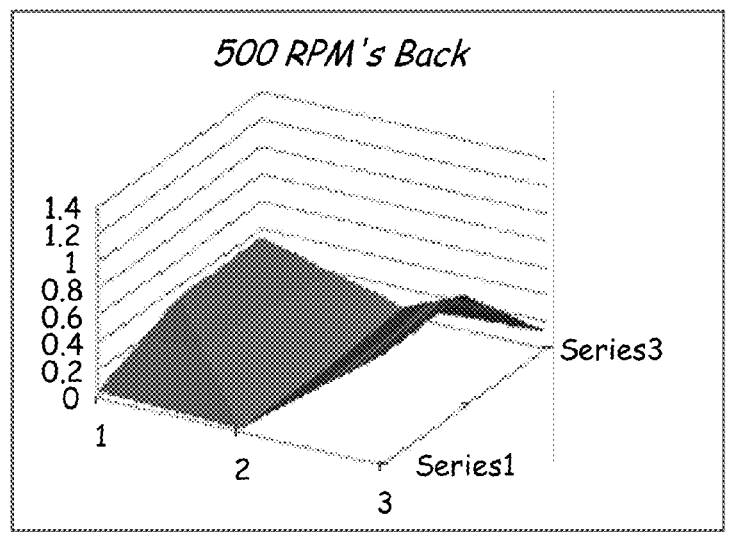
FIGS. 23A-23C are graphical illustrations of first velocity profile test results in the support cleaning system shown in FIGS. 22A-22C for back, middle, and front locations, respectively.
Figure 23B:
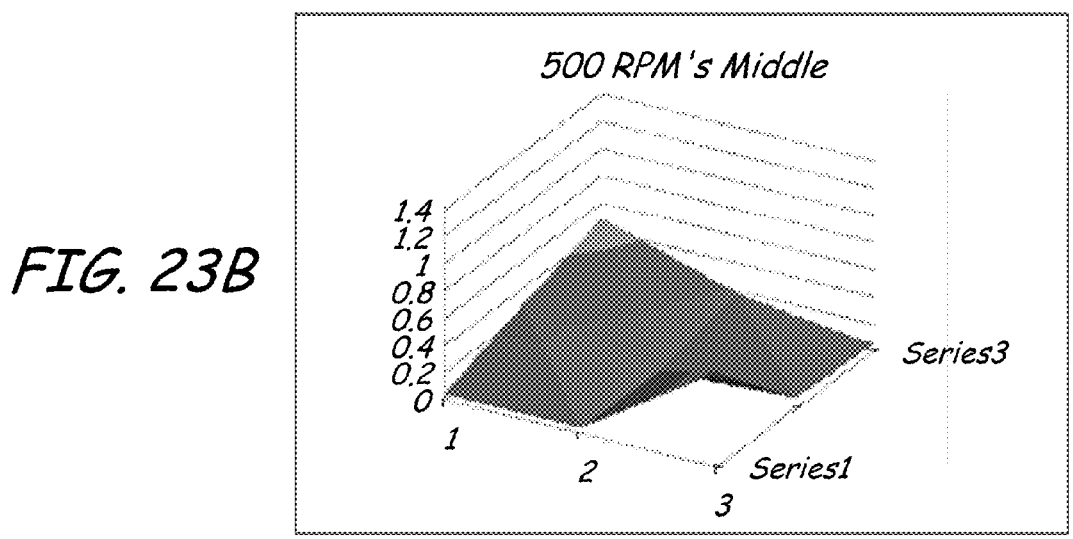
Figure 23C:
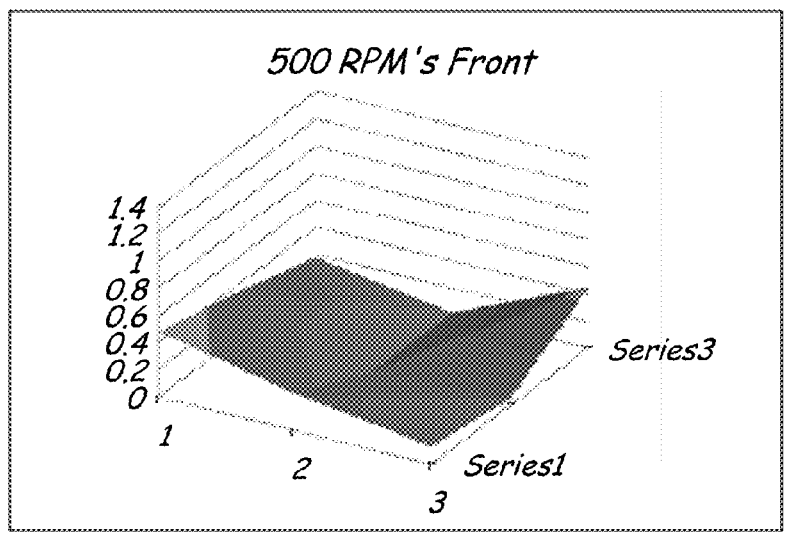
Figure 25A:
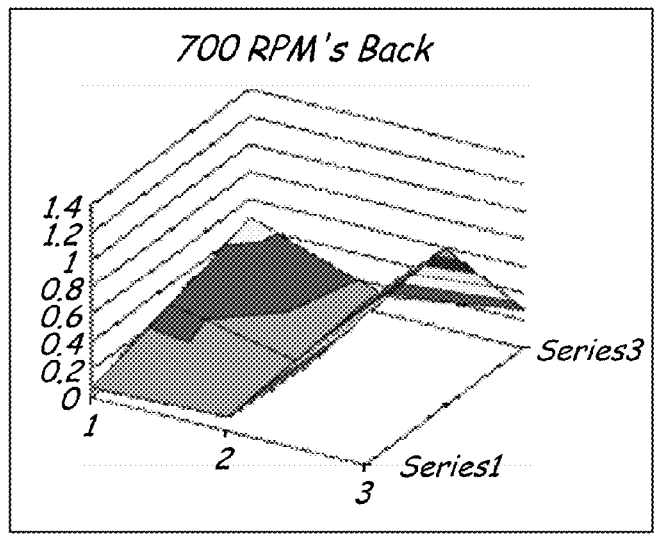
FIGS. 25A-25C are graphical illustrations of third velocity profile test results in the support cleaning system shown in FIGS. 22A-22C for back, middle, and front locations, respectively.
Figure 25B:
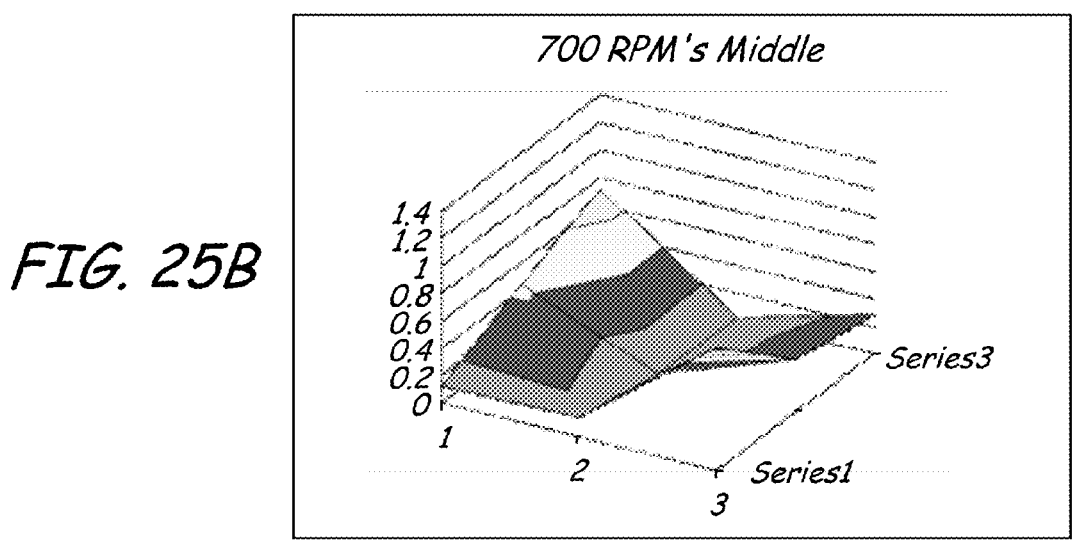
Figure 25C:
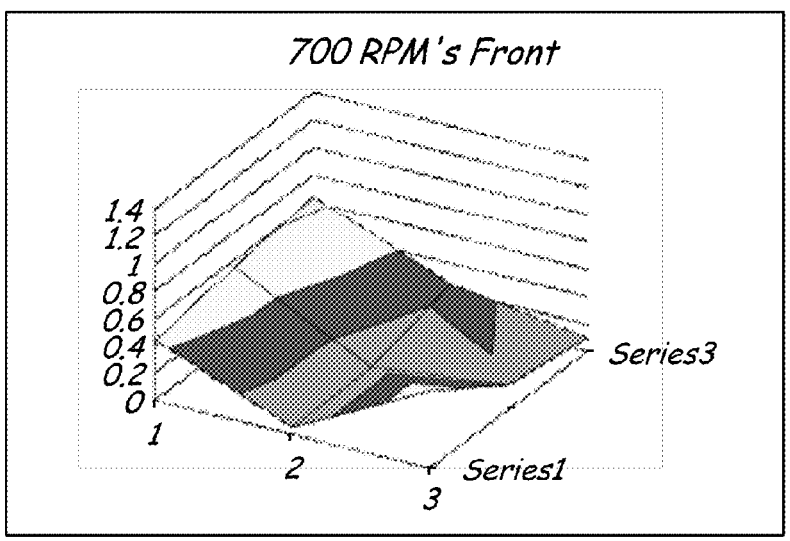

FIGS. 22A-22C are schematic illustrations of a test setup for measuring velocity flow profiles in a support cleaning system corresponding to system 10. As shown in FIG. 22A, the flow velocities were measured in three rows (front, middle, and back). FIG. 22B shows the nine test points for each row, and FIG. 22C shows the probe depths for the test points. Each test was performed with impeller rotational rates of 500 rotations-per-minute (RPM), 600 RPM, and 700 RPM. Tables 7-9 list the results of the velocity profile measurements, where FIGS. 23A-23C are graphical illustrations of the results listed in Table 7, FIGS. 24A-24C are graphical illustrations of the results listed in Table 8, and FIGS. 25A-25C are graphical illustrations of the results listed in Table 9.

TABLE 7

| Impeller Rate | Velocity (meters/second) | | | | | | | | |
|---|---|---|---|---|---|---|---|---|---|
| | Back | | | Middle | | | Front | | |
| 500 RPM | 0.34 | 0.06 | 0.13 | 0.49 | 0.18 | 0.05 | 0.48 | 0.27 | 0.13 |
| | 0.32 | 0.01 | 0.82 | 0.28 | 0.03 | 0.08 | 0.35 | 0.01 | 0.05 |
| | 0.05 | 0.02 | 0.80 | 0.04 | 0.04 | 0.69 | 0.18 | 0.02 | 0.45 |
| 600 RPM | 0.39 | 0.08 | 0.24 | 0.62 | 0.04 | 0.19 | 0.56 | 0.33 | 0.04 |
| | 0.35 | 0.03 | 1.00 | 0.32 | 0.08 | 0.23 | 0.40 | 0.03 | 0.08 |
| | 0.13 | 0.09 | 1.00 | 0.06 | 0.12 | 0.78 | 0.28 | 0.04 | 0.50 |
| 700 RPM | 0.47 | 0.13 | 0.28 | 0.72 | 0.02 | 0.29 | 0.64 | 0.25 | 0.10 |
| | 0.25 | 0.05 | 1.16 | 0.44 | 0.03 | 0.38 | 0.55 | 0.06 | 0.18 |
| | 0.07 | 0.10 | 1.18 | 0.12 | 0.14 | 0.89 | 0.44 | 0.05 | 0.56 |

TABLE 8

| Impeller Rate | Velocity (meters/second) | | | | | | | | |
|---|---|---|---|---|---|---|---|---|---|
| | Back | | | Middle | | | Front | | |
| 500 RPM | 0.34 | 0.06 | 0.13 | 0.49 | 0.18 | 0.05 | 0.48 | 0.27 | 0.13 |
| | 0.32 | 0.01 | 0.82 | 0.28 | 0.03 | 0.08 | 0.35 | 0.01 | 0.05 |
| | 0.05 | 0.02 | 0.80 | 0.04 | 0.04 | 0.69 | 0.18 | 0.02 | 0.45 |
| 600 RPM | 0.39 | 0.08 | 0.24 | 0.62 | 0.04 | 0.19 | 0.56 | 0.33 | 0.04 |
| | 0.35 | 0.03 | 1.00 | 0.32 | 0.08 | 0.23 | 0.40 | 0.03 | 0.08 |
| | 0.13 | 0.09 | 1.00 | 0.06 | 0.12 | 0.78 | 0.28 | 0.04 | 0.50 |
| 700 RPM | 0.47 | 0.13 | 0.28 | 0.72 | 0.02 | 0.29 | 0.64 | 0.25 | 0.10 |
| | 0.25 | 0.05 | 1.16 | 0.44 | 0.03 | 0.38 | 0.55 | 0.06 | 0.18 |
| | 0.07 | 0.10 | 1.18 | 0.12 | 0.14 | 0.89 | 0.44 | 0.05 | 0.56 |

TABLE 9

| Impeller Rate | Velocity (meters/second) | | | | | | | | |
|---|---|---|---|---|---|---|---|---|---|
| | Back | | | Middle | | | Front | | |
| 500 RPM | 0.34 | 0.06 | 0.13 | 0.49 | 0.18 | 0.05 | 0.48 | 0.27 | 0.13 |
| | 0.32 | 0.01 | 0.82 | 0.28 | 0.03 | 0.08 | 0.35 | 0.01 | 0.05 |
| | 0.05 | 0.02 | 0.80 | 0.04 | 0.04 | 0.59 | 0.18 | 0.02 | 0.45 |
| 600 RPM | 0.39 | 0.08 | 0.24 | 0.62 | 0.04 | 0.19 | 0.58 | 0.33 | 0.04 |
| | 0.35 | 0.03 | 1.00 | 0.32 | 0.08 | 0.23 | 0.40 | 0.03 | 0.08 |
| | 0.13 | 0.09 | 1.00 | 0.06 | 0.12 | 0.78 | 0.28 | 0.04 | 0.50 |
| 700 RPM | 0.47 | 0.13 | 0.28 | 0.72 | 0.02 | 0.29 | 0.64 | 0.25 | 0.10 |
| | 0.25 | 0.05 | 1.16 | 0.44 | 0.03 | 0.38 | 0.55 | 0.08 | 0.18 |
| | 0.07 | 0.10 | 1.18 | 0.12 | 0.14 | 0.89 | 0.44 | 0.05 | 0.56 |

As shown, the support cleaning system provides good velocity flow profiles of the aqueous cleaning solution. This correspondingly reduces the time required to dissolve and remove the support structure from a 3D model, particularly when used in combination with the support removal compositions of the present disclosure, such as those described in Examples 1-3.

Although the present disclosure has been described with reference to preferred embodiments, workers skilled in the art will recognize that changes may be made in form and detail without departing from the spirit and scope of the disclosure.

The invention claimed is:

1. An automated method for removing a support structure from a three-dimensional model built with a fused deposition modeling system, the method comprising:
providing a support cleaning system having a tank that is separated into first, second and third chambers with a first wall having first and second ends secured to spaced apart first and second locations on the tank and a second wall having a first end secured to the tank at a third location between the first and second locations and a second end secured to the first wall wherein the first, second and third chambers are in fluid communication with each other with a first plurality of pores in the first wall between the first chamber and the third chamber, a second plurality of pores in the first wall between the first chamber and the second chamber and a third plurality of pores in the second wall between the second chamber and the third chamber;
providing an impeller having blades configured to rotate within the third chamber wherein the blades are aligned with an opening in the first wall wherein the opening is spaced from the first plurality of pores;
inserting the three-dimensional model and the support structure into the first chamber;
introducing a liquid into the tank to fill the tank to a selected fill level;
introducing a solid support removal material into the second chamber wherein the solid support removal material dissolves in the liquid over time to form a support removal composition; and
generating a current with the impeller by forcing the support removal composition through the opening in the first wall and wherein the current causes flow of the support removal composition through an interior volume of the tank in a loop between the third, first, and second chambers such that dissolved solid support removal material in the second chamber is carried to the first chamber and the impeller causes the support removal material to flow into the first chamber to maintain a concentration of the support removal material in the support material removal composition in the first chamber, such that at least a first portion of the support structure is dissolved in the first chamber.

2. The method of claim 1, and further comprising:
providing a user interface for receiving a user input;
initiating an automated support removal operation in response to the user input, comprising the step of:
introducing the liquid into the tank such that the liquid flows through the first, second and third plurality of pores to fill the tank to the selected fill level.

3. The method of claim 2, and further comprising:
draining the tank after the support structure has been removed from the three-dimensional model;
reintroducing the liquid into the tank after draining the tank;
rinsing the three-dimensional model with the liquid, and draining the liquid from the tank.

4. The method of claim 2, and further comprising monitoring the fluid level in the tank to approximately maintain the selected fill level and draining the support material removal composition solution from the tank after at least partially dissolving the support structure.

5. The method of claim 1, wherein the support removal composition material comprises:
a perhydrate-based oxidizing agent;
a chelating agent; and
a material selected from the group consisting of sodium carbonate, sodium bicarbonate and combinations thereof.

6. The method of claim 1, and further comprising automatically draining the tank upon detecting an error condition.

7. The method of claim 1, wherein the support removal composition material comprises:
one or more oxidizing agents;
one or more chelating agents; and
one or more pH modifiers.

8. The method of claim 7, wherein the support removal composition material further comprises a surfactant.

9. The method of claim 8, wherein the surfactant comprises at least one of one or more of alcohol ethoxylates, one or more of alcohol propoxylates, one or more of alkylphenol ethoxylates, one or more of alkyl sulfates, one or more of alkyl sulfonates or one or more of sulfosuccinates.

10. The method of claim 7, wherein the one or more oxidizing agents include at least one of one or more hydrate-based compounds or one or more perhydrate-based compounds.

11. The method of claim 10, wherein the one or more hydrate-based compounds comprise one or more sodium perborates selected from the group consisting of sodium perborate monohydrate, sodium perborate trihydrate, sodium perborate tetrahydrate and combinations thereof.

12. The method of claim 10, wherein the one or more perhydrate-based compounds comprises sodium percarbonate.

13. The method of claim 7, wherein the one or more chelating agents comprise at least one of one or more glutamic acids, one or more glutamic acetates, iminodisuccinic acid or sodium iminodisuccinate.

14. The method of claim 7, wherein the one or more pH modifiers comprise at least one of one or more citric acids, one or more acetic acids, one or more citric acetates or one or more acetic acetates.

15. The method of claim 1, and further comprising heating the support material removal composition in the tank.

16. A method for removing a support structure from a three-dimensional model built with a fused deposition modeling system, the method comprising:
providing a tank having an interior volume configured to receive a solvent, where the interior volume is divided into a plurality of chambers via a plurality of porous walls with a first wall of the plurality of porous walls having first and second ends secured to spaced apart first and second locations on the tank and a second wall of the plurality of porous walls having a first end secured to the tank at a third location between the first and second locations and a second end secured to the first wall of the plurality of porous walls wherein the plurality of chambers comprises a first chamber, a second chamber, and a third chamber in fluid communication with each other with a first plurality of pores in the first wall of the plurality of porous walls between the first chamber and the third chamber, a second plurality of pores in the first wall of the plurality of porous walls between the first chamber and the second chamber, and a third plurality of pores in the second wall of the plurality of porous walls between the second chamber and the third chamber, wherein the plurality of porous walls configured to allow the solvent to flow therethrough wherein the first chamber of the plurality of chambers is configured to receive the three-dimensional model and support structure;
providing an impeller pump having blades configured to rotate within the third chamber of the plurality of chambers wherein the blades are aligned with an opening in the first wall of the plurality of porous walls wherein said first wall separates the third chamber and the first chamber wherein the opening is spaced apart from pores in the first wall of the plurality of porous walls;
providing a solid support material removal composition in the second chamber wherein the solid support material removal composition dissolves in the solvent over time;
filling the tank with the solvent to a fill level;
placing the three-dimensional model with the support structure in the first chamber; and
generating a current in the interior volume of the tank wherein the impeller forces the solvent through the opening in the first wall of the plurality of porous walls separating the third and the first chamber and circulating the solvent in a loop through the plurality of chambers to at least partially remove the support structure from the three-dimensional model.

17. The method of claim 16, wherein the solvent is an aqueous solution.

18. The method of claim 17, wherein the impeller pump is configured to intake the aqueous solution from the second chamber and direct a flow of the aqueous solution into and through the first chamber and into the third chamber, wherein the aqueous solution in the third chamber flows into the second chamber as the impeller pump directs the aqueous solution from the second chamber and into the first chamber.

* * * * *

UNITED STATES PATENT AND TRADEMARK OFFICE
CERTIFICATE OF CORRECTION

PATENT NO. : 9,855,589 B2  
APPLICATION NO. : 14/679392  
DATED : January 2, 2018  
INVENTOR(S) : Dunn et al.

Page 1 of 1

It is certified that error appears in the above-identified patent and that said Letters Patent is hereby corrected as shown below:

In the Claims

Claim 5: Column 26, Line 62, delete "composition"

Claim 7: Column 27, Line 5, delete "composition"

Claim 8: Column 27, Line 10, delete "composition"

Signed and Sealed this
Second Day of October, 2018

Andrei Iancu
*Director of the United States Patent and Trademark Office*